US011205773B2

(12) United States Patent
Yachi et al.

(10) Patent No.: US 11,205,773 B2
(45) Date of Patent: Dec. 21, 2021

(54) FIBROUS CARBON-CONTAINING ELECTRODE MIXTURE LAYER FOR NONAQUEOUS ELECTROLYTE SECONDARY BATTERIES, ELECTRODE FOR NONAQUEOUS ELECTROLYTE SECONDARY BATTERIES COMPRISING SAME, AND NONAQUEOUS ELECTROLYTE SECONDARY BATTERY

(71) Applicant: TEIJIN LIMITED, Osaka (JP)

(72) Inventors: Kazuki Yachi, Osaka (JP); Shinya Komura, Osaka (JP); Ryota Hirakawa, Osaka (JP); Takahiro Daido, Osaka (JP); Takashi Shiro, Osaka (JP)

(73) Assignee: TEIJIN LIMITED, Osaka (JP)

(*) Notice: Subject to any disclaimer, the term of this patent is extended or adjusted under 35 U.S.C. 154(b) by 142 days.

(21) Appl. No.: 15/128,187

(22) PCT Filed: Mar. 26, 2015

(86) PCT No.: PCT/JP2015/059525
§ 371 (c)(1),
(2) Date: Sep. 22, 2016

(87) PCT Pub. No.: WO2015/147234
PCT Pub. Date: Oct. 1, 2015

(65) Prior Publication Data
US 2017/0098822 A1   Apr. 6, 2017

(30) Foreign Application Priority Data

Mar. 28, 2014 (JP) .............................. JP2014-068568

(51) Int. Cl.
*H01M 4/36* (2006.01)
*H01M 4/62* (2006.01)
(Continued)

(52) U.S. Cl.
CPC ............ *H01M 4/364* (2013.01); *H01M 4/13* (2013.01); *H01M 4/625* (2013.01);
(Continued)

(58) Field of Classification Search
None
See application file for complete search history.

(56) References Cited

U.S. PATENT DOCUMENTS 4,939,028 A * 7/1990 Bachot ................. C25B 11/035
428/312.2
6,194,099 B1 * 2/2001 Gernov ................... H01M 4/36
29/623.5

(Continued)

FOREIGN PATENT DOCUMENTS

EP   2006941 A1   12/2008
JP   11-345607 A   12/1999
(Continued)

OTHER PUBLICATIONS

Kurita et al., "Measuring the size of individual particles from three-dimensional imaging experiments," Nature Communications 3, Article No. 1127 (2012) (Year: 2012).*

(Continued)

*Primary Examiner* — Amanda J Barrow
(74) *Attorney, Agent, or Firm* — Sughrue Mion, PLLC

(57) ABSTRACT

The present invention provides an electrode mixture layer for nonaqueous electrolyte secondary batteries, which contains an electrode active material, a carbon-based conductive agent containing fibrous carbon having an average effective length of 10 μm, and a binder, and which has a thickness of 50 μm or more. This electrode mixture layer has an inner layer portion where the fibrous carbon is three-dimensionally dispersed in a random manner.

11 Claims, 13 Drawing Sheets

(51) Int. Cl.
*H01M 10/0525* (2010.01)
*H01M 4/13* (2010.01)
*H01M 4/02* (2006.01)
*H01M 10/052* (2010.01)

(52) U.S. Cl.
CPC ...... *H01M 10/0525* (2013.01); *H01M 10/052* (2013.01); *H01M 2004/021* (2013.01)

(56) References Cited

U.S. PATENT DOCUMENTS

| | | | |
|---|---|---|---|
| 2006/0014077 A1* | 1/2006 | Hatou | H01M 4/0404 429/231.1 |
| 2007/0042901 A1* | 2/2007 | Kurose | B01J 21/18 502/180 |
| 2007/0202410 A1* | 8/2007 | Takeuchi | H01M 4/131 429/232 |
| 2008/0096098 A1 | 4/2008 | Shirakata et al. | |
| 2008/0318133 A1* | 12/2008 | Matsuyama | H01M 4/13 429/300 |
| 2011/0193014 A1 | 8/2011 | Sotowa et al. | |
| 2011/0206992 A1* | 8/2011 | Campbell | H01M 4/80 429/235 |
| 2012/0126182 A1* | 5/2012 | Zhang | H01M 4/5835 252/507 |
| 2013/0130116 A1 | 5/2013 | Ryu et al. | |
| 2013/0164618 A1 | 6/2013 | Konishi | |
| 2014/0042372 A1* | 2/2014 | Tonegawa | C01B 25/45 252/506 |
| 2014/0332673 A1* | 11/2014 | Lehman | G01J 5/20 250/216 |
| 2014/0345661 A1* | 11/2014 | Roy | H01L 35/34 136/201 |
| 2017/0341183 A1* | 11/2017 | Buller | B29C 64/393 |

FOREIGN PATENT DOCUMENTS

| | | | |
|---|---|---|---|
| JP | 2006-86116 A | 3/2006 | |
| JP | 2006127823 A | 5/2006 | |
| JP | 2007-80652 A | 3/2007 | |
| JP | 2008-181850 A | 8/2008 | |
| JP | 2010-15904 A | 1/2010 | |
| JP | 2012-64537 A | 3/2012 | |
| JP | 2013-122883 A | 6/2013 | |
| WO | WO 2012/144469 | * 10/2012 | ............ H01M 4/58 |
| WO | 2013/098962 A1 | 7/2013 | |

OTHER PUBLICATIONS

Poon et al, "On measuring colloidal volume fractions," Soft Matter, 2012, 8, 21-30 (Year: 2012).*

Karsli et al., "Effects of initial fiber length and fiber length distribution on the properties of carbon-fiber-reinforced-polypropylene composites," Journal of Reinforced Plastics and Composites 31 (15) 1053-1060, Aug. 2012 (Year: 2012).*

Supplementary European Search Report dated Jan. 3, 2017, issued by the European Patent Office in corresponding European application No. 15769157.7.

Seri Ananthan: "Methods for Determination of Length Parameters of Cotton Fibers", Jul. 1, 1978, XP055329921, retrieved from the Internet URL: https://law.resource.org/pub/in/bis/S12/is.233.1-4.1978.pdf [Retrieved on Dec. 16, 2016] ( 31 pages total).

Anonymous: "VGCF(TM)-H | Products | Showa Denko K.K.", Jan. 24, 2018 (Jan. 24, 2018), XP055444117, Retrieved from the Internet: URL: http://www.sdk.co.jp/english/products/126/132/2094.html [retrieved on Jan. 24, 2018 by EPO Examiner]; 2 pages.

Seung Su Kim et al.: "Drying of coated film" In: "Handbook of Solvents", Jan. 1, 2001 (Jan. 1, 2001), Chemtec Publishing, Toronto—New York, XP055443983, ISBN: 978-1-895198-24-9 pp. 386-417.

International Search Report of PCT/JP2015/059525, dated Jun. 30, 2015. [PCT/ISA/210].

* cited by examiner

[Fig. 1]
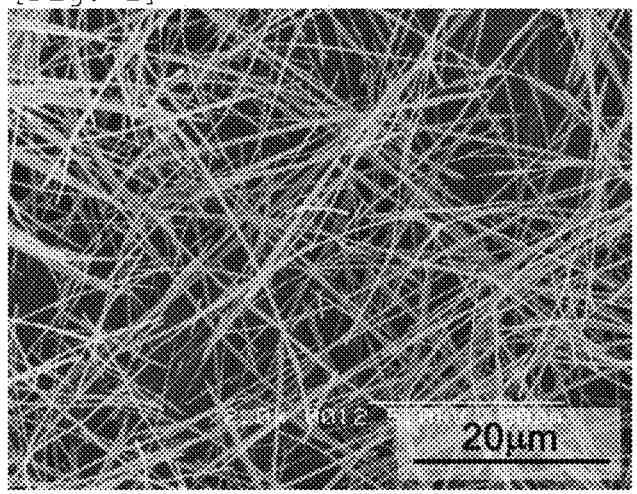
[Fig. 2]
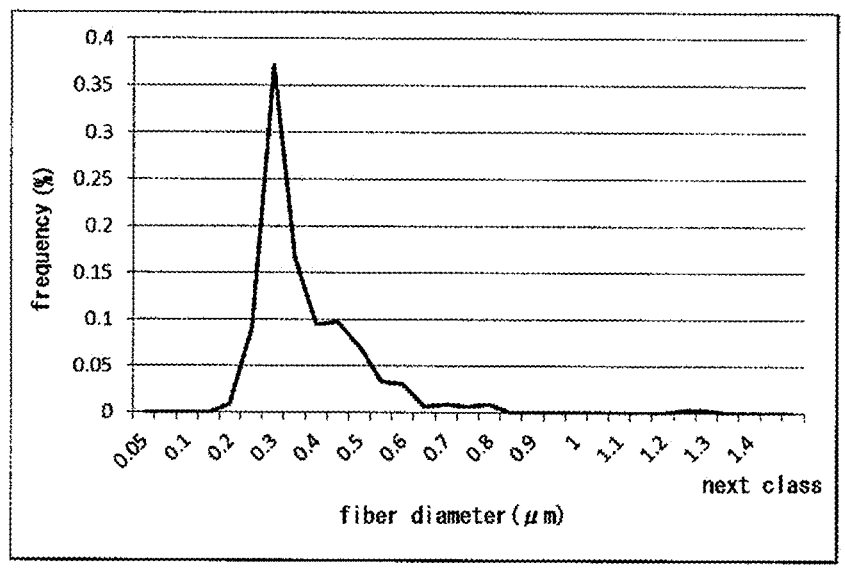

[Fig. 3]
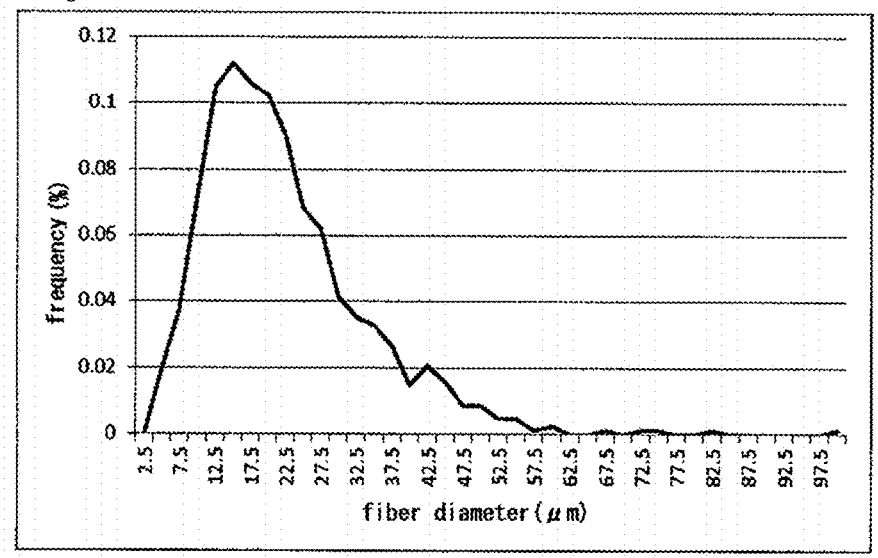
[Fig. 4]
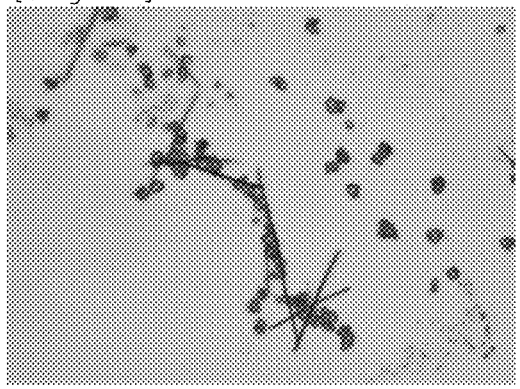
[Fig. 5]
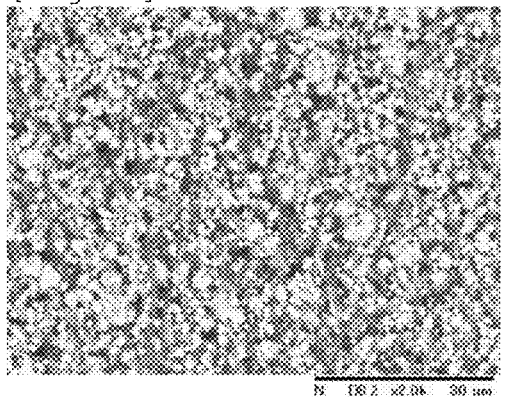

[Fig. 6]
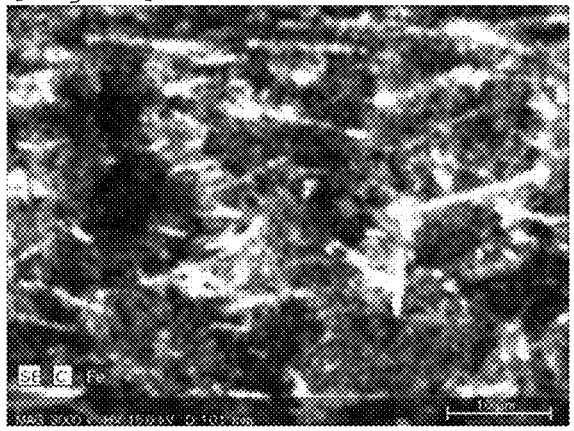
[Fig. 7]
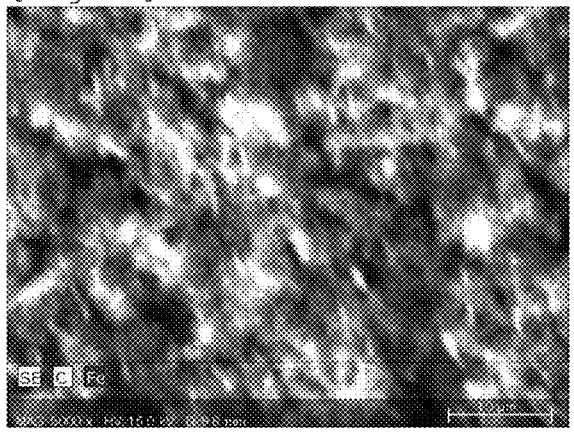
[Fig. 8]
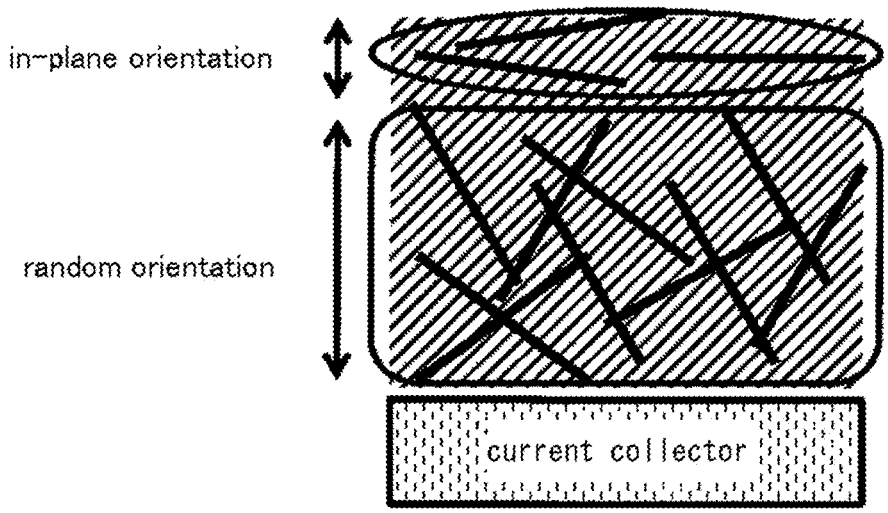

[Fig. 9]
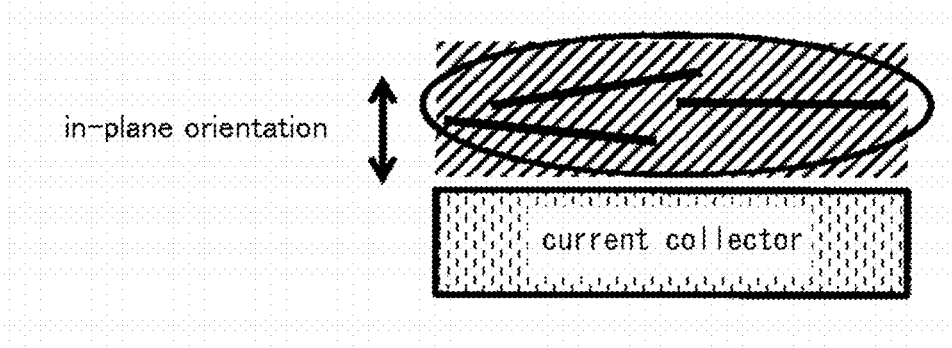
[Fig. 10]
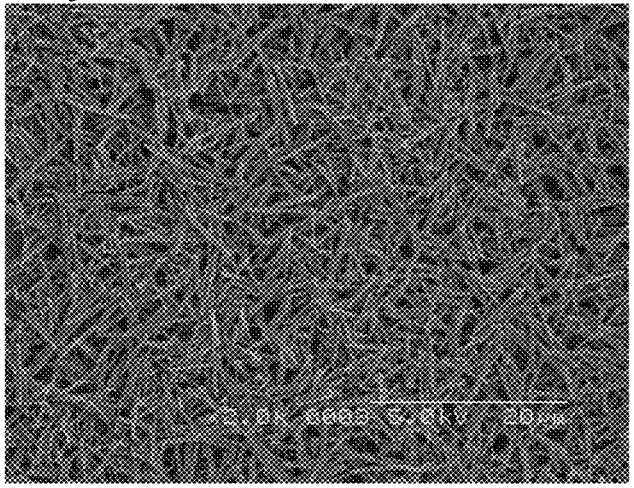
[Fig. 11]
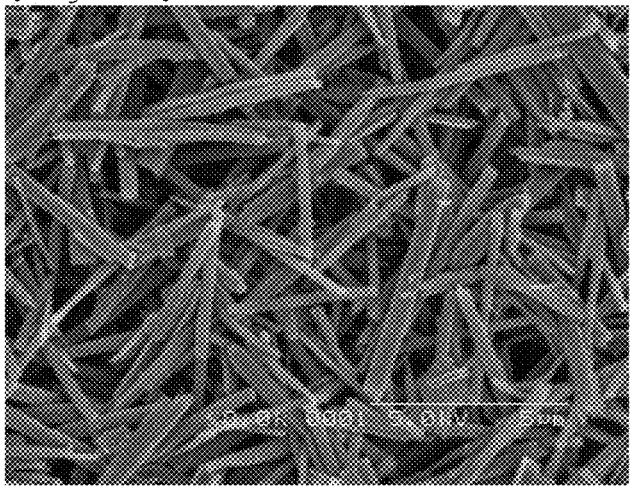

[Fig. 12]
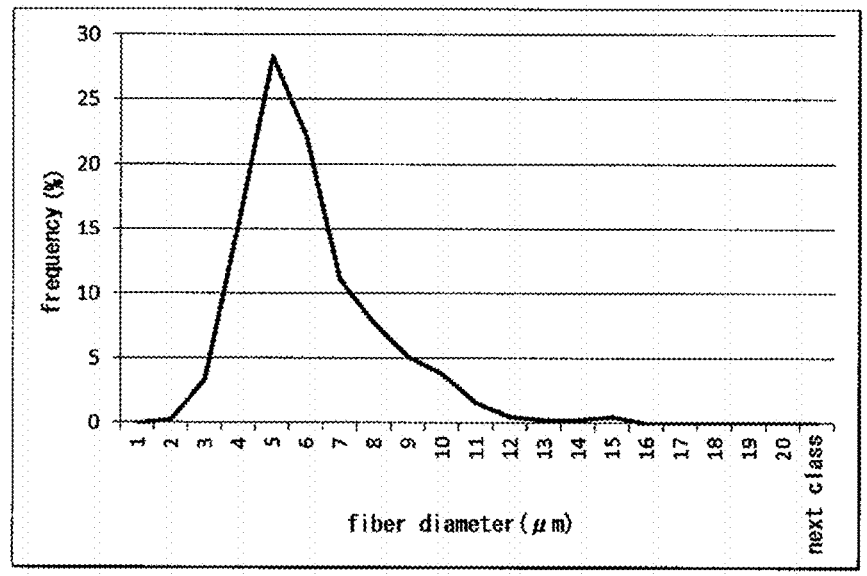
[Fig. 13]
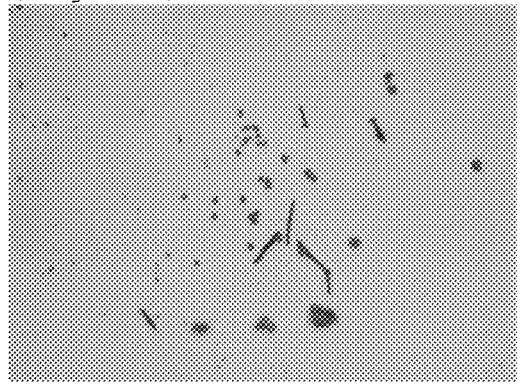
[Fig. 14]
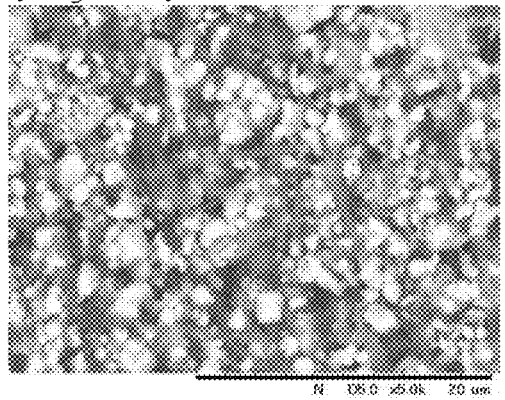

[Fig. 15]
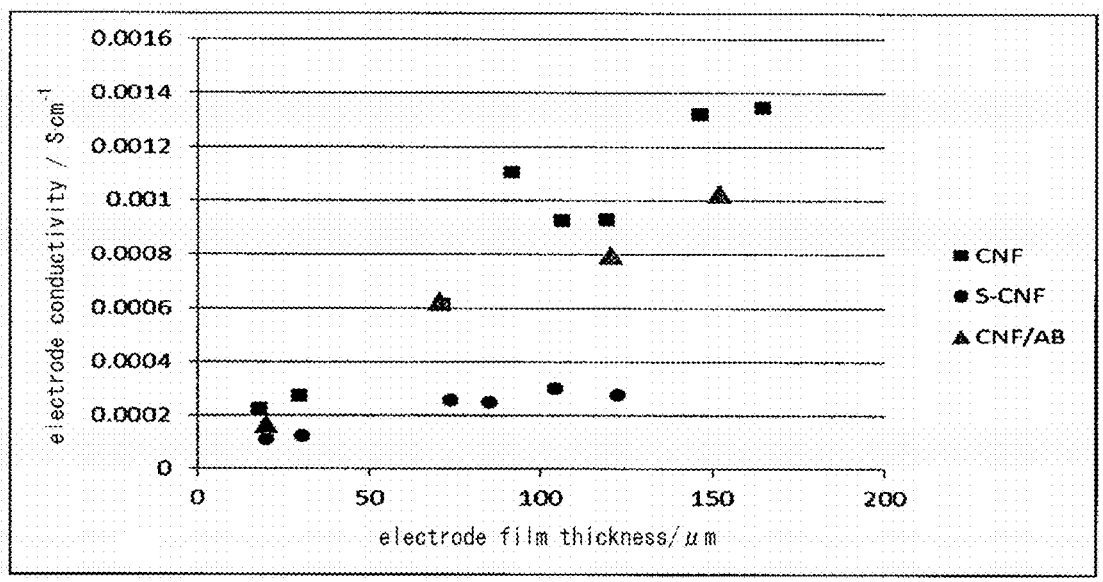
[Fig. 16]
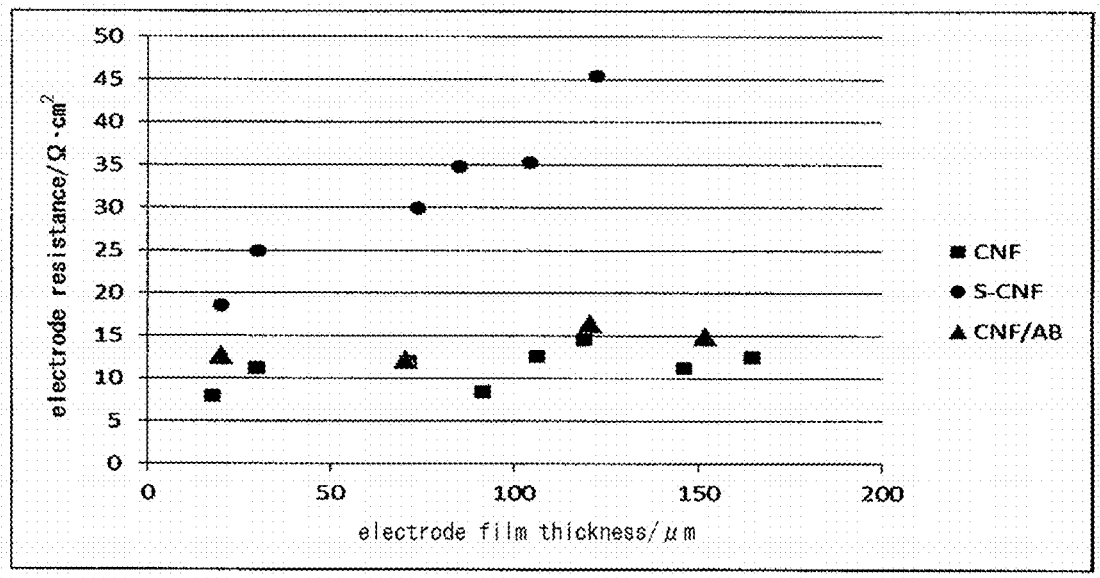

[Fig. 17]
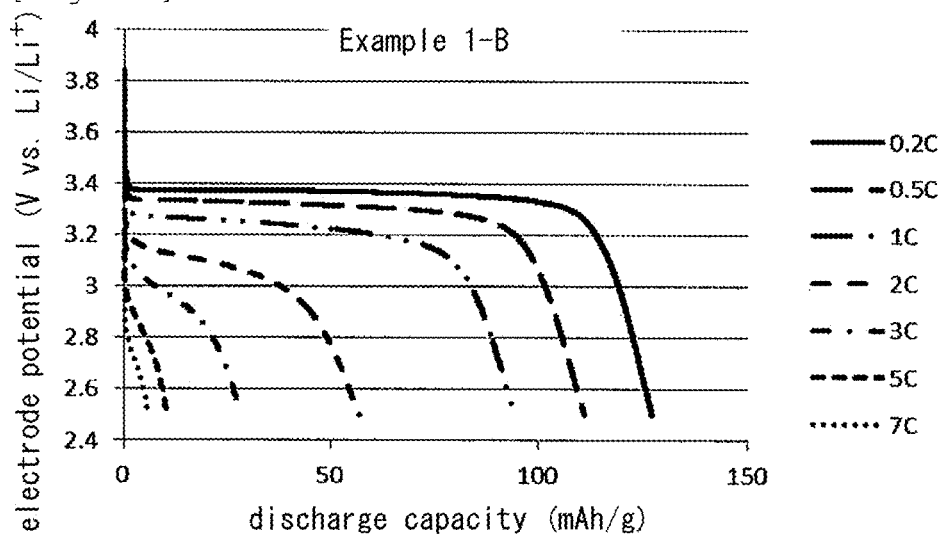
[Fig. 18]
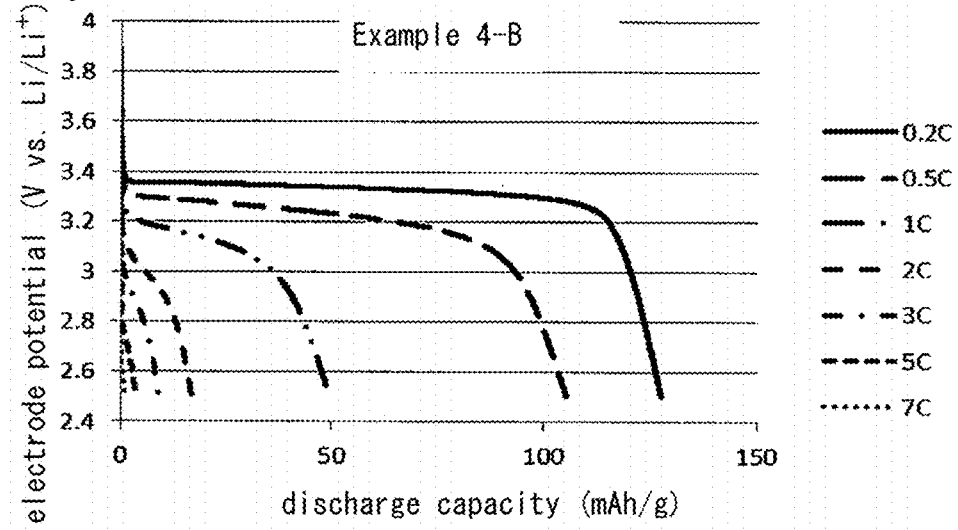

[Fig. 19]
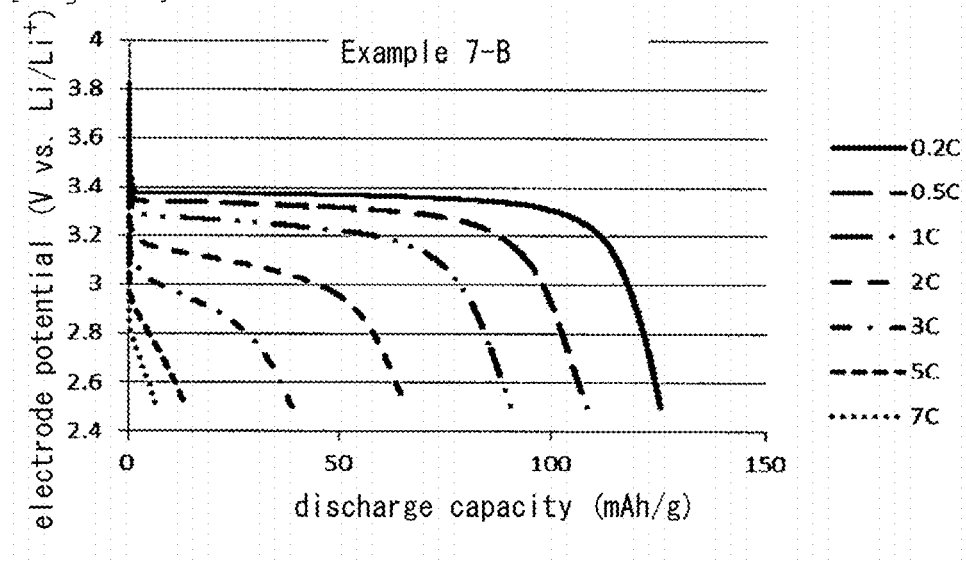
[Fig. 20]
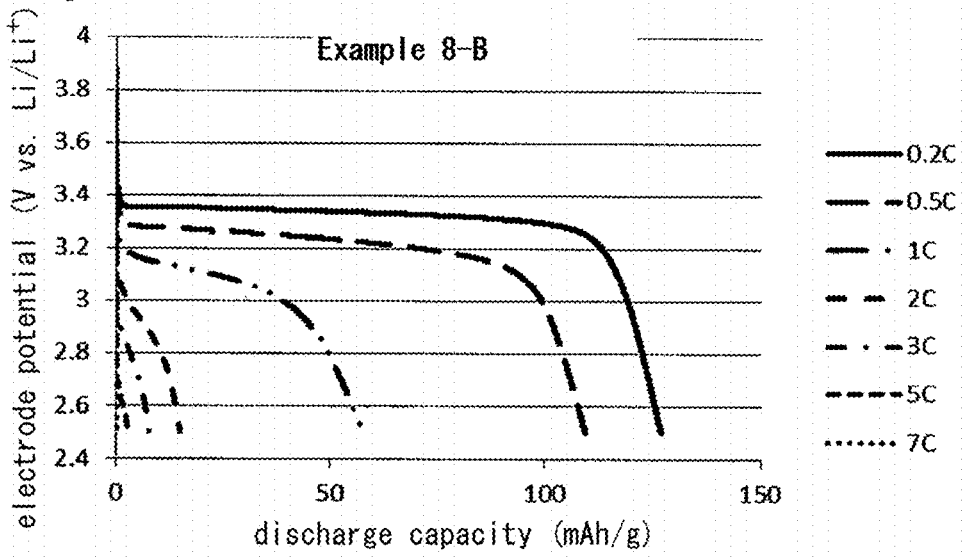

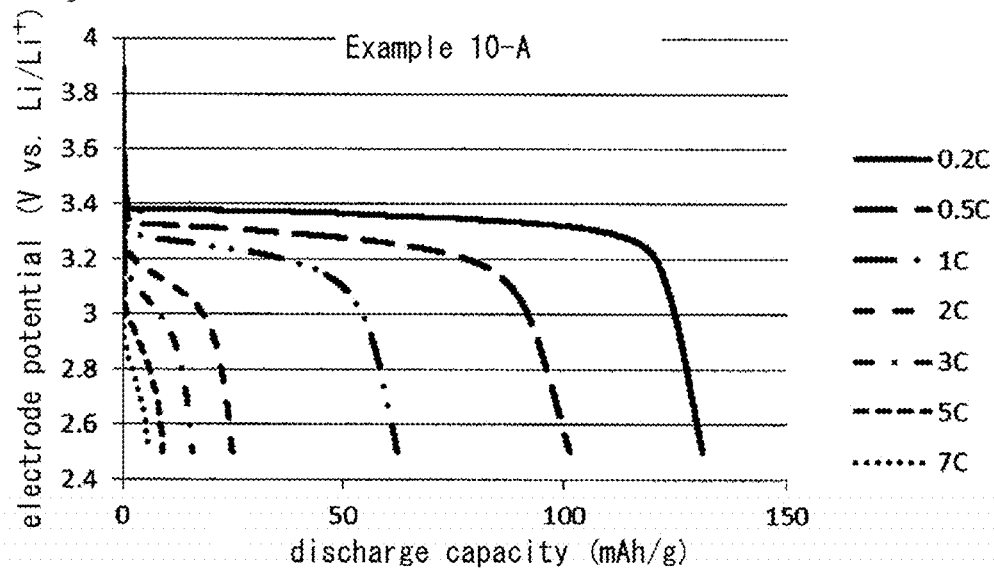
[Fig. 21]
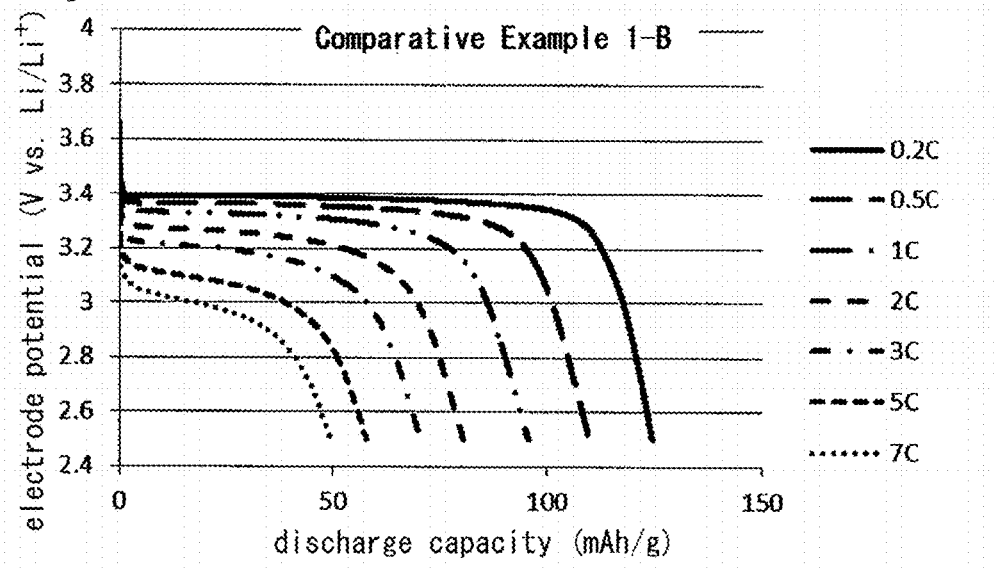
[Fig. 22]

[Fig. 23]
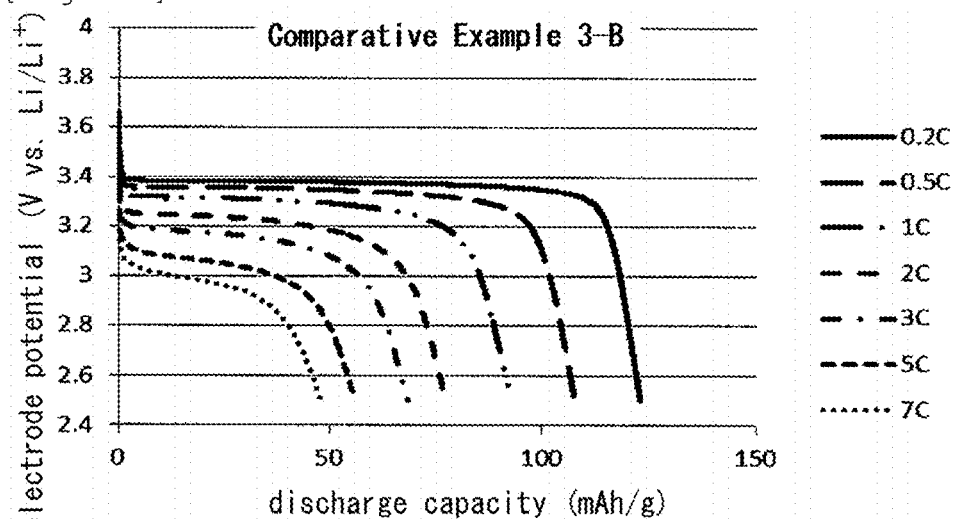
[Fig. 24]
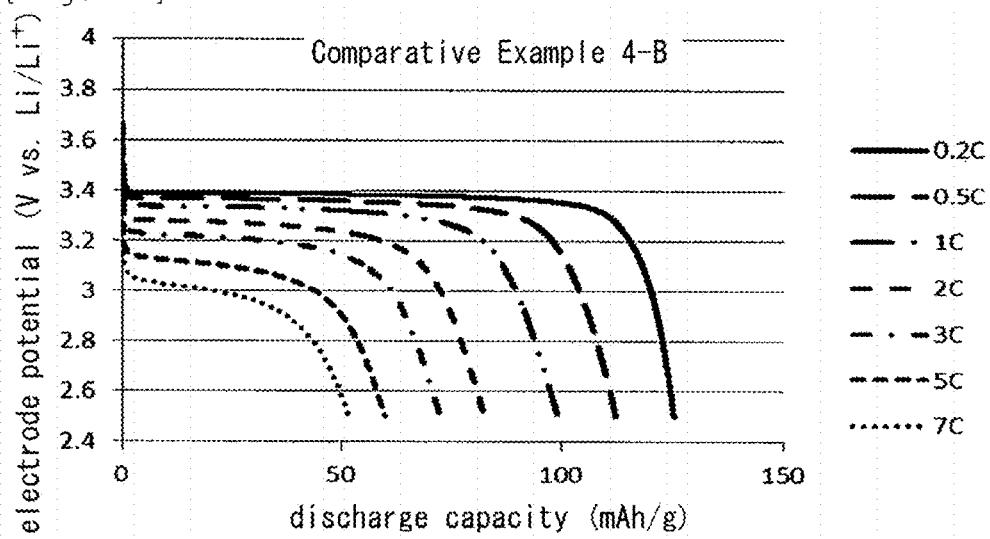

[Fig. 25]
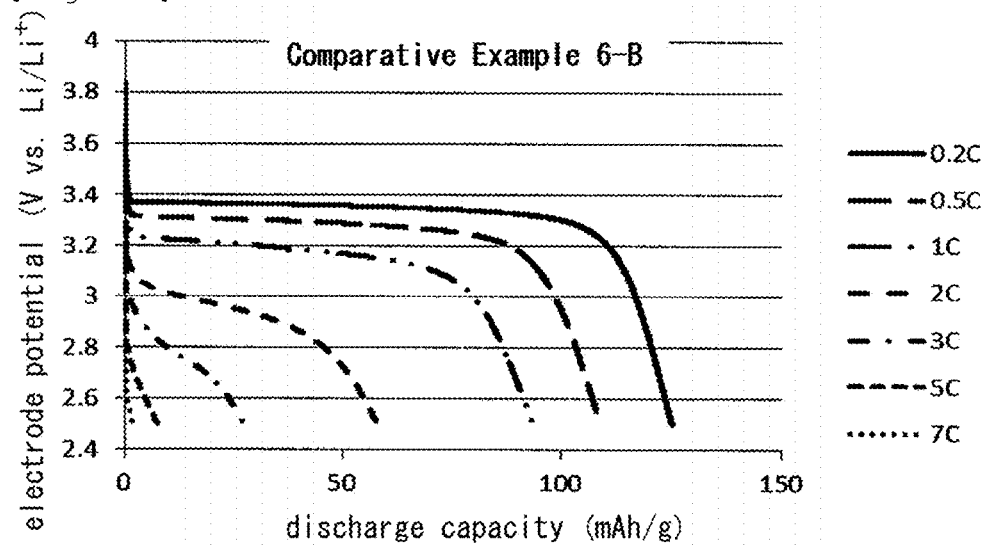
[Fig. 26]
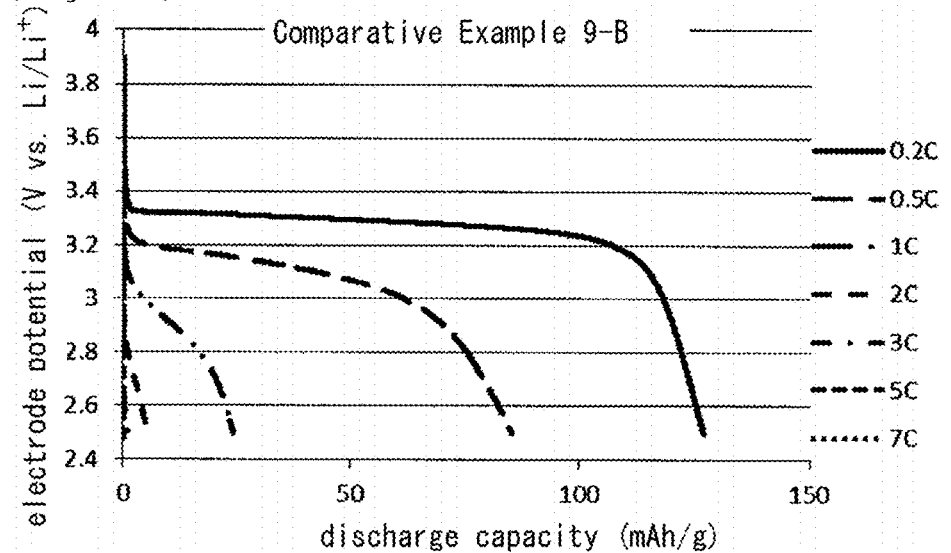

[Fig. 27]
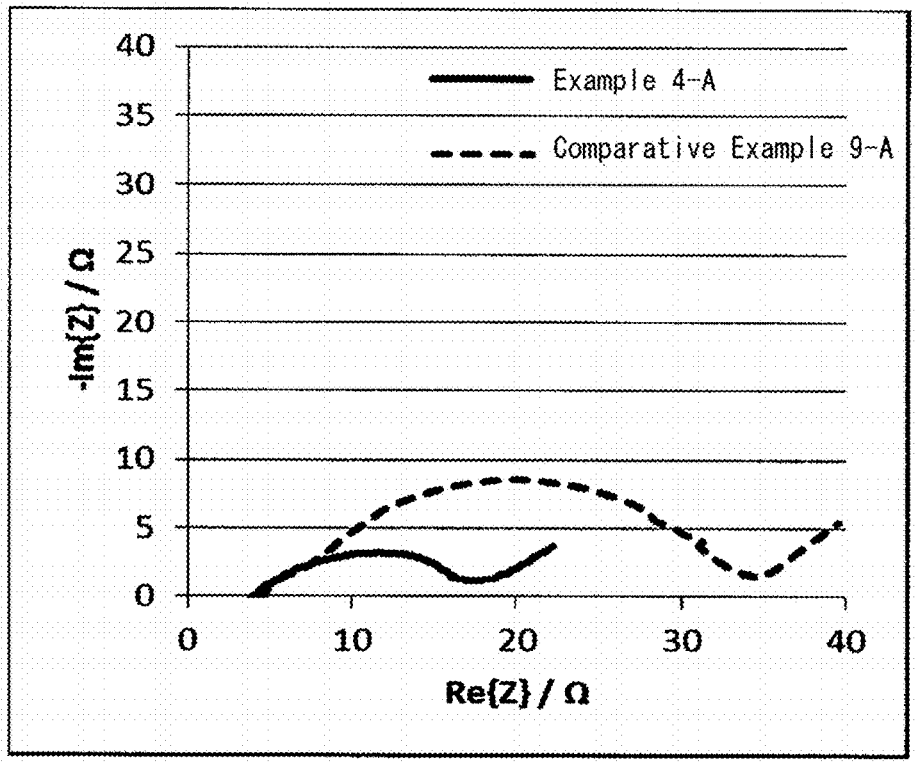
[Fig. 28]
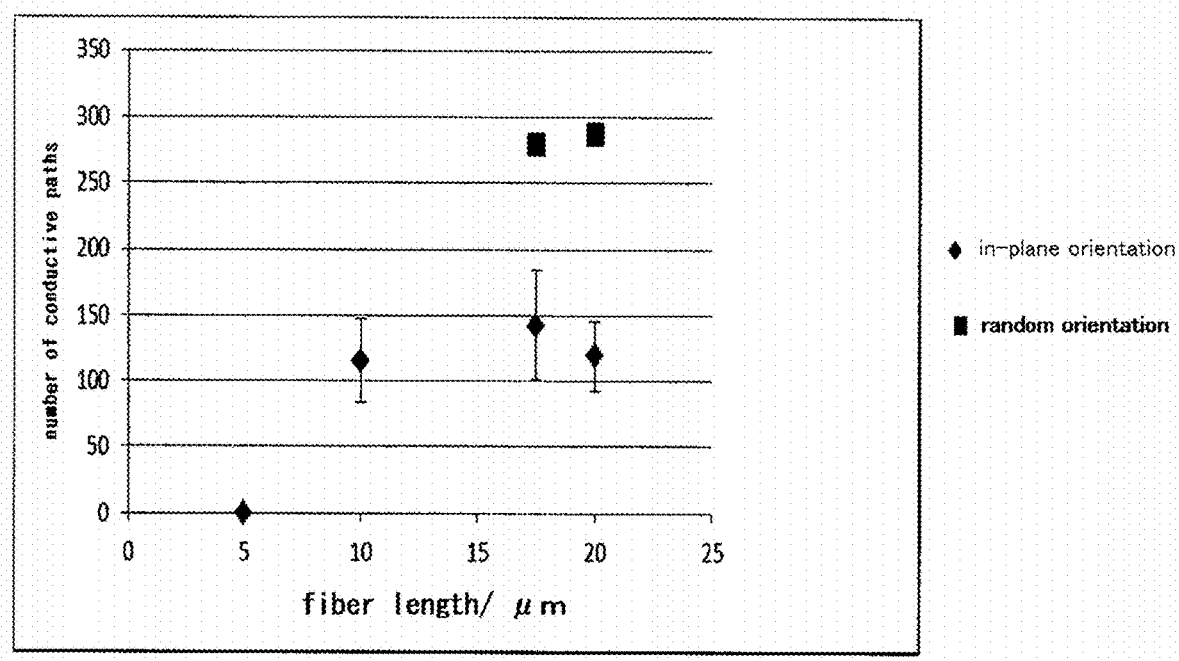

[Fig. 29]
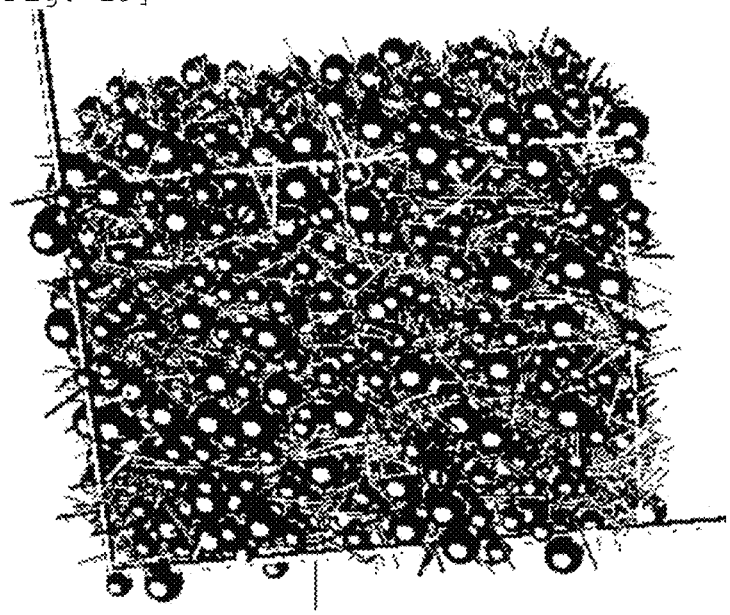
[Fig. 30]
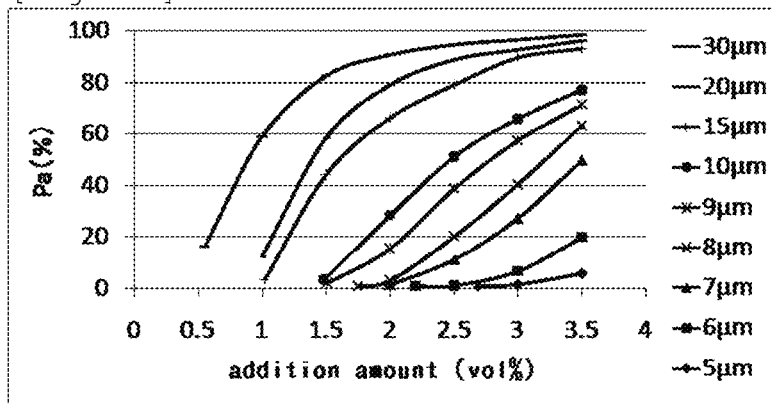
[Fig. 31]
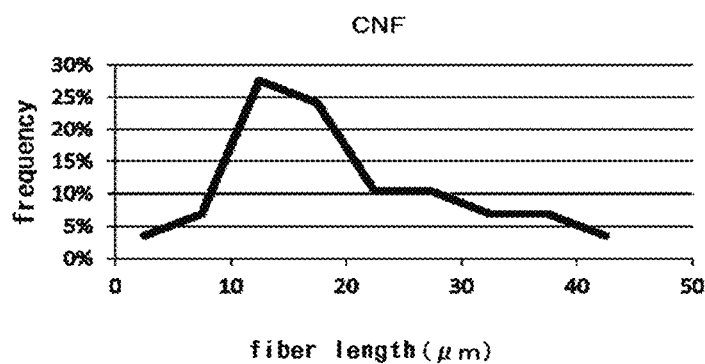

FIBROUS CARBON-CONTAINING ELECTRODE MIXTURE LAYER FOR NONAQUEOUS ELECTROLYTE SECONDARY BATTERIES, ELECTRODE FOR NONAQUEOUS ELECTROLYTE SECONDARY BATTERIES COMPRISING SAME, AND NONAQUEOUS ELECTROLYTE SECONDARY BATTERY

CROSS REFERENCE TO RELATED APPLICATIONS

This application is a National Stage of International Application No. PCT/JP2015/059525 filed Mar. 26, 2015 (claiming priority based on Japanese Patent Application No. 2014-068568, filed Mar. 28, 2014), the contents of which are incorporated herein by reference in their entirety.

TECHNICAL FIELD

The present invention relates to an electrode mixture layer for nonaqueous electrolyte secondary batteries. Specifically, the present invention relates to a fibrous carbon-containing electrode mixture layer for nonaqueous electrolyte secondary batteries, an electrode for nonaqueous electrolyte secondary batteries including the electrode mixture layer, and a nonaqueous electrolyte secondary battery.

BACKGROUND ART

A lithium ion secondary battery which is a kind of nonaqueous electrolyte secondary battery is a secondary battery in which a lithium ion in an electrolyte conducts electricity. A mainstream secondary battery uses a lithium metal oxide as an electrode active material in a positive electrode, and uses a carbon material such as graphite as an electrode active material in a negative electrode. A lithium ion secondary battery is characterized by having a high energy density among secondary batteries, and therefore an application range thereof has been widened. from a small device such as a mobile phone to a large device such as an electric automobile.

A lithium ion battery has been required to have a higher energy density. As one method therefor, it is considered to thicken an electrode layer to increase a support amount of an electrode active material. However, one of problems caused by a thicker-film electrode layer is that a conductive path to a current collector is not formed sufficiently, an electric resistance of an electrode is increased, and a capacity retention ratio of a battery is reduced at a high output.

As a method for reducing a resistance of an electrode, increase in an electrode density has been proposed. However, it is also described that a too high electrode density makes a porosity low and inhibits dispersion of a substance, leading to rise in a resistance (refer to Patent Literature 1). That is, it is considered that reduction in a resistance due to optimization of an electrode density has a limitation.

As another method, it has been also proposed that by adding fibrous carbon as a conductive agent and generating an electrostatic field, the fibrous carbon is oriented in a film thickness direction of an electrode corresponding to a conductive direction of a battery (refer to Patent Literature 2). However, a method for orienting in such a way is time-consuming. In addition, the method may damage a separator during formation of a battery.

CITATION LIST

Patent Literature

Patent Literature 1: JP 2010-15904 A
Patent Literature 2: JP 2013-12268 A

SUMMARY OF INVENTION

Technical Problem

An object of the present invention is to provide an electrode mixture layer for nonaqueous electrolyte secondary batteries having a low electric resistance, an electrode for nonaqueous electrolyte secondary batteries including the electrode mixture layer, and a nonaqueous electrolyte secondary battery including the electrode.

Solution to Problem

In order to solve the above object, the present inventors made intensive studies in view of the above related art. As a result, the present inventors have found that an electric resistance of an electrode can be low even with a thicker-film electrode layer by forming a long conductive path in an electrode mixture layer using fibrous carbon having a predetermined effective length, and have completed the present invention.

A first aspect of the present invention is an electrode mixture layer for nonaqueous electrolyte secondary batteries, including an electrode active material, a carbon-based conductive agent containing fibrous carbon having an average effective length of 10 μm or more, and a binder, and the electrode mixture layer having a film thickness of 50 μm or more, characterized in that the electrode mixture layer includes an inner layer portion in which the fibrous carbon is three-dimensionally dispersed in a random manner.

In the first aspect of the present invention, the degree of orientation of the fibrous carbon in the inner layer portion in an in-plane direction of the electrode mixture layer is preferably 0.1 or more and less than 0.7.

In the first aspect of the present invention, the fibrous carbon preferably has an average fiber diameter of 50 to 900 nm.

In the first aspect of the present invention, an average aspect ratio of the fibrous carbon and a volume content of the fibrous carbon preferably satisfy the following formula (1).

$$0.8 \leq \text{average aspect ratio} \times \text{volume content (vol\%)} \leq 3.5 \quad \text{formula (1)}$$

In the first aspect of the present invention, the content of fibrous carbon having an average effective length of 10 μm or more is preferably 10% by mass or more with respect to the total mass of the carbon-based conductive agent.

In the first aspect of the present invention, the content of fibrous carbon having an effective length longer than the average effective length is preferably 50% or less with respect to the whole fibrous carbon based on the number of fibers.

In the first aspect of the present invention, the average effective length of the fibrous carbon is preferably ⅓ or less of the film thickness of the electrode mixture layer.

In the first aspect of the present invention, a surface layer portion in which the fibrous carbon is oriented in an in-plane direction is preferably formed on one surface of the inner layer portion. The degree of orientation of the fibrous carbon in the surface layer portion in an in--plane direction is preferably 0.7 or more and less than 1.0. The decree of orientation of the fibrous carbon in an in-plane direction is preferably reduced gradually from the surface layer portion to the inner layer portion. The thickness of the surface layer portion is preferably from 0.05 to 20 μm.

A second aspect of the present invention is an electrode mixture layer for nonaqueous electrolyte secondary batteries, including an electrode active material, a carbon-based conductive agent containing fibrous carbon having an average effective length of 10 μm or more, and a binder, and the electrode mixture layer having a film thickness of 50 μm or more, characterized in that the average effective length of the fibrous carbon is ⅓ or less of the film thickness of the electrode mixture layer.

In the second aspect of the present invention, the fibrous carbon preferably has an average fiber diameter of 50 to 900 nm.

In the second aspect of the present invention, the content of fibrous carbon having an average effective length of 10 μm or more is preferably 10% by mass or more with respect to the total mass of the carbon-based conductive agent.

In the second aspect of the present invention, the content of fibrous carbon having an effective length longer than the average effective length is preferably 50% or less with respect to the whole fibrous carbon based on the number of fibers.

In the second aspect of the present invention, an average aspect ratio of the fibrous carbon and a volume content of the fibrous carbon preferably satisfy the following formula (1).

$$0.8 \leq \text{average aspect ratio} \times \text{volume content(vol \%)} \leq 3.5 \quad \text{formula (1)}$$

A third aspect of the present invention is an electrode mixture layer for nonaqueous electrolyte secondary batteries, including an electrode active material, a carbon-based conductive agent containing fibrous carbon having an average effective length of 10 μm or more, and a binder, and the electrode mixture layer having a film thickness of 50 μm or more, characterized in that the content of the fibrous carbon in the electrode mixture layer is from 0.5 to 3.0% by mass, and the electric conductivity in the film thickness direction is 0.0005 $Scm^{-1}$ or more.

In the third aspect of the present invention, the electrode mixture layer preferably includes an inner layer portion in which the fibrous carbon is three-dimensionally dispersed in a random manner.

In the third aspect of the present invention, the fibrous carbon preferably has an average fiber diameter of 50 to 900 nm.

In the third aspect of the present invention, the average effective length of the fibrous carbon is preferably ⅓ or less of the film thickness of the electrode mixture layer.

In the third aspect of the present invention, the content of fibrous carbon having an effective length longer than the average effective length is preferably 50% or less with respect to the whole fibrous carbon based on the number of fibers.

A fourth aspect of the present invention is an electrode mixture layer for nonaqueous electrolyte secondary batteries, including an electrode active material, a carbon-based conductive agent containing fibrous carbon having an average effective length of 10 μm or more, and a binder, and the electrode mixture layer having a film thickness of 50 μm or more, characterized in that an average aspect ratio of the fibrous carbon and a volume content of the fibrous carbon satisfy the following formula (1).

$$0.8 \leq \text{average aspect ratio} \times \text{volume content(vol \%)} \leq 3.5 \quad \text{formula (1)}$$

The present invention also includes an electrode for nonaqueous electrolyte secondary batteries, including a current collector and the electrode mixture layer for nonaqueous electrolyte secondary batteries according to any one of the first to fourth aspects of the invention, stacked on a surface of the current collector.

The present invention also includes a nonaqueous electrolyte secondary battery including the electrode for nonaqueous electrolyte secondary batteries.

Advantageous Effects of Invention

The electrode mixture layer for nonaqueous electrolyte secondary batteries of the present invention. (hereinafter, also simply referred to as "electrode mixture layer") includes fibrous carbon having an average effective length of 10 μm or more, and therefore a long conductive path can be formed in the electrode mixture layer. Therefore, the electrode mixture layer can be formed into a thicker-film electrode mixture layer. As a result, rate characteristics of a thick-film electrode in a film thickness direction are excellent, the electric resistance is low, and it is possible to provide a nonaqueous electrolyte secondary battery having a large battery capacity at a high output. The electrode mixture layer for nonaqueous electrolyte secondary batteries of the present invention is useful for a nonaqueous electrolyte secondary battery having excellent output characteristics, particularly for a lithium ion secondary battery.

BRIEF DESCRIPTION OF DRAWINGS

FIG. 1 is a scanning electron microscopic image (2,000 times) of fibrous carbon.

FIG. 2 is a graph (histogram) illustrating a fiber diameter of fibrous carbon in a powder.

FIG. 3 is a graph (histogram) illustrating a fiber length of fibrous carbon in a powder.

FIG. 4 is a photograph (digital microscopic image, magnification: 3,000 times) obtained by observing an electrode including fibrous carbon after the electrode is dissolved in a solvent again and is dried.

FIG. 5 is a scanning electron microscopic image (2,000 times) of a surface of an electrode including fibrous carbon.

FIG. 6 is a photograph obtained by observing a surface layer portion of a cross section of an electrode including fibrous carbon with a scanning electron microscope (3,000 times) and performing element mapping thereof in an energy dispersive X-ray analyzer.

FIG. 7 is a photograph obtained by observing a central portion of a cross section of an electrode including fibrous carbon with a scanning electron microscope (5,000 times) and performing element mapping thereof in an energy dispersive X-ray analyzer.

FIG. 8 exemplifies a schematic diagram illustrating orientation of fibrous carbon in a thick-film electrode.

FIG. 9 exemplifies a schematic diagram illustrating orientation of fibrous carbon in a thin-film electrode.

FIG. 10 is a scanning electron microscopic image (2,000 times) of fibrous carbon (S-CNF) used in Comparative Examples 4 to 9.

FIG. 11 is a scanning electron microscopic image (8,000 times) of fibrous carbon (S-CNF) used in Comparative Examples 4 to 9.

FIG. 12 is a graph (histogram) illustrating a fiber length of fibrous carbon. (S-CNF) in a powder used in Comparative Examples 4 to 9.

FIG. 13 is a digital macroscopic image (magnification: 3,000 times) obtained by observing an electrode including fibrous carbon (S-CNF) used in Comparative Examples 4 to 9 after the electrode is dissolved in a solvent again and is dried.

FIG. 14 is a scanning electron microscopic image (5,000 times) of a surface of an electrode including fibrous carbon (S-CNF) used in Comparative Examples 4 to 9.

FIG. 15 is a graph obtained by plotting electrode conductivities of electrodes.

FIG. 16 is a graph obtained by plotting electrode resistances of electrodes.

FIG. 17 is a graph illustrating discharge rate characteristics of electrodes measured in Example 1-B.

FIG. 18 is a graph illustrating discharge rate characteristics of electrodes measured in Example 4-B.

FIG. 19 is a graph illustrating discharge rate characteristics of electrodes measured in Example 7-B.

FIG. 20 is a graph illustrating discharge rate characteristics of electrodes measured in Example 8-B.

FIG. 21 is a graph illustrating discharge rate characteristics of electrodes measured in Example 10-A, FIG. 22 is a graph illustrating discharge rate characteristics of electrodes measured in Comparative Example 1-B.

FIG. 23 is a graph illustrating discharge rate characteristics of electrodes measured in Comparative Example 3-B.

FIG. 24 is a graph illustrating discharge rate characteristics of electrodes measured in Comparative Example 4-B, FIG. 25 is a graph illustrating discharge rate characteristics of electrodes measured in Comparative Example 6-B, FIG. 26 is a graph illustrating discharge rate characteristics of electrodes measured an Comparative Example 9-B, FIG. 27 is a graph (Cole-Cole plot diagram) obtained by measuring AC impedances of electrodes measured in Example 4-A and Comparative Example 9-A, FIG. 28 is a graph obtained by plotting the number of conductive path of electrode, obtained by a simulation.

FIG. 29 is a diagram exemplifying spherical particles and fillers generated in simulation.

FIG. 30 illustrates a simulation analysis result of percolation behaviors of fibrous carbon having different fiber lengths.

FIG. 31 is a graph (histogram) illustrating an effective length of fibrous carbon obtained by disassembling an electrode mixture layer in Example 1.

DESCRIPTION OF EMBODIMENTS

Hereinafter, four aspects of an electrode mixture layer of the present invention will be described.

Here, fibrous carbon, an effective length thereof, and the degree of orientation thereof are defined as follows.

(i) Fibrous Carbon

In the present invention, fibrous carbon means fibrous carbon material having an average fiber diameter of less than 1000 nm and an average effective length of 3 to 100 µm. Examples of the carbon material include a monolayer carbon nanotube, a multilayer carbon nanotube, a carbon nanofiber, a carbon nanohorn, and a carbon fiber.

(ii) Effective Length of Fibrous Carbon

The length of the fibrous carbon used in the present invention is defined not by an actual fiber length but by an effective length. This is because the fibrous carbon does not necessarily contribute to electric conduction with an actual fiber length in the electrode mixture layer. For example, the fibrous carbon does not contribute to electric conduction with an actual fiber length in some cases because a fiber is folded or rounded in the electrode mixture layer. In the present invention, the effective length of the fibrous carbon is defined as a length of the longest, line segment both ends of which are in contact with a single fiber of the fibrous carbon. In other words, the effective length is the largest linear distance at which a single fiber of the fibrous carbon can conduct electricity. That is, when the fibrous carbon has a complete linear structure, the effective length thereof is approximately equal to the fiber length thereof. When the fibrous carbon has a branched structure or is rounded, the effective length means a maximum length of a line segment connecting two points on the single fiber of the fibrous carbon.

(iii) The Degree of Orientation

In the present invention, the degree of orientation is defined as a value obtained by dividing an average fiber length of the fibrous carbon observed from a surface of the electrode mixture layer or a cross section parallel to the surface by an effective, length of the fibrous carbon in a powder obtained by disassembling the electrode mixture layer. That is, when the surface of the electrode mixture layer is parallel to a fiber axis direction of the fibrous carbon, the degree of orientation of the fibrous carbon in an in-plane direction is 1. The average fiber length of the fibrous carbon observed from a surface of the electrode mixture layer or a cross section parallel to the surface is an average value of lengths measured by selecting 20 fibers in a random manner.

1. Electrode Mixture Layer According to First Aspect

A first aspect of the invention is an electrode mixture layer for nonaqueous electrolyte secondary batteries, including an electrode active material, a carbon-based conductive agent containing fibrous carbon having an average effective length of 10 µm or more, and a binder, and the electrode mixture layer having a film thickness of 50 µm or more, characterized in that the electrode mixture layer includes an inner layer portion in which the fibrous carbon is three-dimensionally dispersed in a random manner.

The electrode mixture layer according to the first aspect of the invention has a low electric resistance in a thickness direction. (film thickness direction) of an electrode, and therefore an electrode layer can be formed into a thicker-film electrode layer. Therefore, a nonaqueous electrolyte secondary battery using the electrode mixture layer has excellent output characteristics.

The thickness (film thickness) of the electrode mixture layer of the present invention is 50 µm or more, preferably 60 µm or more, more preferably 70 µm or more, still more preferably 80 µm or more, particularly preferably 90 µm or more, further preferably 100 µm or more, particularly further preferably more than 100 µm, and most preferably 120 µm or more. The thickness (film thickness) of the electrode mixture layer of the present invention is not particularly limited, but is preferably 1000 µm or less, more preferably less than 1000 µm, still more preferably less than 900 µm, and particularly preferably less than 800 µm. The thickness (film thickness) of the electrode mixture layer of the present invention is from 50 to 1000 µm, preferably from 80 to 1000 µm, more preferably from 100 to 1000 µm, and particularly preferably from 120 to 1000 µm.

When the film thickness of the electrode mixture layer is less than 50 µm, in a case where a cell having an optional capacity is manufactured, many separators and current collectors are used to reduce a volume occupancy of an active material layer in the cell. This is not preferable from a viewpoint of an energy density, and poses significant restrictions on application. Particularly, application to a power source highly requiring an energy density is difficult. Meanwhile, an electrode having a film thickness of the electrode mixture layer of more than 1000 μm easily generates a crack in the electrode mixture layer, and it is relatively difficult to manufacture the electrode. The film thickness of the electrode mixture layer is preferably 1000 μm or less from a viewpoint, of manufacturing an electrode stably. In an electrode having a film thickness of the electrode mixture layer of more than 1000 μm, transportation of a Li ion is easily inhibited, leading to rise in a resistance. Therefore, the film thickness of the electrode mixture layer is preferably 1000 μm or less from a viewpoint of reduction in a resistance.

A method for measuring the film thickness of the electrode mixture layer is not particularly limited. However, for example, the film thickness can be measured using a micrometer.

In the first aspect of the invention, the inner layer portion is formed in the electrode mixture layer. The inner layer portion is a layer in which the fibrous carbon is three-dimensionally dispersed in a random manner in the electrode mixture layer. Three-dimensional dispersion of the fibrous carbon in a random manner forms a conductive path in the film thickness direction to reduce a resistance of the electrode mixture layer in the film thickness direction. When the fibrous carbon is two-dimensionally oriented in the in-plane direction of the electrode mixture layer, the fibrous carbon does not easily form a conductive path in the film thickness direction. The degree of orientation of the fibrous carbon in the in-plane direction in the inner layer portion is preferably less than 0.7, more preferably 0.1 or more and less than 0.7, still more preferably 0.1 or more and less than 0.6, and particularly preferably 0.1 or more and less than 0.5. When the degree of orientation is 0.7 or more, orientation in the in-plane direction is too large, and a resistance in the film thickness direction is hardly reduced sufficiently. Meanwhile, it is difficult to make the degree of orientation less than 0.1.

The porosity of the electrode mixture layer is preferably from 15 to 60%, and more preferably from 20 to 50%. A porosity of less than 15% is not preferable from a viewpoint of a high output because movement. of an ion is inhibited. A porosity of more than 60% is not preferable because a capacity density per volume is small.

In the first aspect of the invention, the inner layer portion is formed in the electrode mixture layer. A surface layer portion in which the fibrous carbon is oriented in the in-plane direction is preferably formed on one surface of the inner layer portion. The surface layer portion is formed on a surface on an opposite side to the current collector during formation of a battery, that is, on a side of the separator.

The degree of orientation of the fibrous carbon in the in-plane direction in the surface layer portion is 0.7 or more, preferably 0.7 or more and less than 1, more preferably 0.75 or more and less than 1, and still more preferably 0.8 or more and less than 1. When the degree of orientation is less than 0.7, a fiber axis of the fibrous carbon present in the surface layer portion of the electrode mixture layer may damage the separator during formation of a battery.

The thickness of the surface layer portion is 20 μm or less, preferably 0.05 μm or more and 20 μm or less, and more preferably 1 μm or more and 20 μm or less. When the thickness of the surface layer portion is more than 20 μm, a resistance of the electrode mixture layer in the film thickness direction is increased easily.

In the first aspect of the invention, when the inner layer portion and the surface layer portion are formed in the electrode mixture layer, the inner layer portion and the surface layer portion do not need to be distinguished by a clear interface. That is, it is only necessary that the degree of orientation of the fibrous carbon in the in-plane direction is less than 0.7 in a range from a surface of the electrode mixture layer to a depth 20 μm. The degree of orientation of the fibrous carbon in the in-plane direction may be reduced gradually from the surface layer portion to the inner layer portion.

(1) Carbon-Based Conductive Agent

The electrode mixture layer of the present invention includes a carbon-based conductive agent. The carbon-based conductive agent contained in the electrode mixture layer essentially contains fibrous carbon having an average effective length of 10 μm or more.

The fibrous carbon contained in the electrode mixture layer of the present invention is not particularly limited as long as exhibiting an effect of the present invention. Typical examples thereof include natural graphite, artificial graphite manufactured by heat-treating petroleum-based coke and coal-based coke, hardly graphitizable carbon, and easily graphitizable carbon. Among these examples, easily graphitizable carbon is preferable. Easily graphitizable carbon is a carbon raw material having a three-dimensional lamination regularity by a heat treatment at a high temperature of 2,500° C. or higher to easily generate a graphite structure. Easily graphitizable carbon is also referred to as soft carbon or the like. Examples of easily graphitizable carbon include petroleum coke, coal pitch coke, polyvinyl chloride, and a 3,5-dimethyl phenol formaldehyde resin. Among these examples, a compound capable of forming an optically anisotropic phase (liquid crystal phase) in a molten state, called mesophase pitch, or a mixture thereof is preferable because high crystallinity and high conductivity are expected. Examples of mesophase pitch include petroleum-based mesophase pitch obtained by a method mainly including hydrogenation and a heat treatment of petroleum residual oil or by a method mainly including hydrogenation, a heat treatment, and solvent extraction; coal-based mesophase pitch obtained by a method mainly including hydrogenation and a heat treatment of coal tar pitch or by a method mainly including hydrogenation, a heat treatment, and solvent extraction; and synthetic liquid crystal pitch obtained by polycondensation of an aromatic hydrocarbon such as naphthalene, alkyl naphthalene, or anthracene as a raw material in the presence of a super strong acid (for example, HF or $BF_3$). Among these examples, synthetic liquid crystal pitch is more preferable in terms of containing no impurities. A spacing d (002) of plane (002) in a graphite structure by powder X-ray diffraction is preferably in a range of 0.335 to 0.340 nm from a viewpoint of conductivity of the fibrous carbon.

A method for manufacturing the fibrous carbon is not particularly limited, but a known method can be used.

The average effective length of the fibrous carbon contained in the electrode mixture layer of the present invention is 10 μm or more, preferably in a range of 10 to 100 μm, more preferably in a range of 12 to 80 μm, and still more preferably in a range of 15 to 70 μm. A longer average effective length of the fibrous carbon is preferable because conductivity in an electrode for nonaqueous electrolyte secondary batteries, a strength of the electrode, and an electrolytic solution retention property are higher. However, when the average effective length is too long, the fibrous carbon is easily oriented in the in-plane direction of the electrode mixture layer. As a result, it is difficult to form a conductive path in the film thickness direction. Therefore, the average effective length of the fibrous carbon in the present invention is preferably within the above range.

The average effective length of the fibrous carbon is preferably ⅓ or less of the thickness (film thickness) of the electrode mixture layer, and more preferably 3/10 or less thereof. When the average effective length is more than ⅓ thereof, the fibrous carbon is easily oriented in the in-plane direction, and it is difficult to three-dimensionally orient the fibrous carbon in a random manner.

The average effective length of the fibrous carbon is preferably 1/100 or more of the thickness (film thickness) of the electrode mixture layer, more preferably 1/70 or more thereof, and still more preferably 1/50 or more thereof. When the average effective length is less than 1/100 thereof, a conductive path formed by the fibrous carbon becomes short easily. As a result, a resistance value of the electrode mixture layer in the film thickness direction is not necessarily reduced sufficiently.

The fibrous carbon in the present invention preferably has a linear structure. Here, the linear structure means a structure having the degree of branching of 0.01/μm or less. Branching means that a main axis of the fibrous carbon is branched in the middle or has a branch-shaped sub axis.

FIG. 1 is a scanning electron micrograph (2,000 times) exemplifying the fibrous carbon used in the present invention. As clear from FIG. 1, it can be confirmed that the fibrous carbon in the present invention has a linear structure and the average effective length is from 3 to 100 μm.

As a method for measuring an effective length of fibrous carbon contained in the electrode mixture layer, the following method can be used. First, the electrode mixture layer is dissolved in a solvent capable of dissolving the electrode mixture layer, and is disassembled. The whole fibrous carbon embedded in the electrode mixture layer is exposed. This fibrous carbon is photographed using a field emission scanning electron microscope to measure an effective length of the fibrous carbon from the resulting photographic view.

The fibrous carbon in the present invention is an ultra fine fiber. The average fiber diameter thereof is less than 1000 nm, preferably in a range of 50 to 900 nm, more preferably in a range of 100 to 600 nm, still more preferably in a range of 150 to 500 nm, and particularly preferably in a range of 200 to 400 nm. This average fiber diameter is a value measured with the photographic view taken using a field emission scanning electron microscope. When the average fiber diameter is less than 50 nm, the fibrous carbon is folded or rounded, and the effective length thereof becomes short easily. Meanwhile, when the average fiber diameter is more than 900 nm, the number of fibers per unit mass is small. As a result, formation of a conductive path may be insufficient.

An aspect ratio of the fibrous carbon in the present invention and a volume content of the fibrous carbon preferably satisfy the following formula (1).

$$0.8 \leq \text{average aspect ratio} \times \text{volume content(vol \%)} \leq 3.5 \quad \text{formula (1)}$$

The range in formula (1) is more preferably 0.9 or more and 3.0 or less, and still more preferably 1.0 or more and 2.5 or less.

Here, the volume content means a ratio of the fibrous carbon with respect to the electrode mixture layer.

The content of fibrous carbon having an effective length of 10 μm or more is preferably 10% by mass or more and 100% by mass or less, more preferably 20% by mass or more, and still more preferably 30% by mass or more with respect to the total blending amount of the carbon-based conductive agent. When the content is less than 10% by Mass, formation of a conductive path becomes insufficient easily, and a resistance value of the electrode mixture layer in the film thickness direction is not necessarily reduced sufficiently.

In the fibrous carbon, the content of fibrous carbon having an effective length longer than the average effective length is preferably 50% or less, more preferably 40% or less, and particularly preferably 30% or less based on the number of fibers with respect to the total number of fibers of the fibrous carbon. The lower limit is preferably 10% or more. The content of more than 50% is not preferable from a viewpoint of formation of a long conductive path because a large part of the fibrous carbon is occupied by short fibrous carbon having an effective length much shorter than the average effective length.

Examples of a carbon-based conductive agent other than the fibrous carbon include carbon black, acetylene black, scaly carbon, graphene, and graphite.

The electrode mixture layer of the present invention may contain one or more kinds of these carbon-based conductive agents.

(2) Electrode Active Material

Next, an electrode active material (positive electrode active material and negative electrode active material) contained in the electrode mixture layer of the present invention will be described in detail.

[Positive Electrode Active Material]

As a positive electrode active material contained in the electrode mixture layer of the present invention, any one or more kinds of conventionally known materials known as a positive electrode active material in a nonaqueous electrolyte secondary battery can be appropriately selected to be used. For example, in a case of a lithium ion secondary battery, a lithium-containing metal oxide capable of occluding and releasing a lithium ion is suitable. Examples of this lithium-containing metal oxide include a composite oxide containing lithium and at least one element selected from the group consisting of Co, Mg, Mn, Ni, Fe, Al, Mo, V, W, Ti, and the like.

Specific examples thereof include at least one selected from the group consisting of $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_oNi_{2-o}O_4$, $Li_xMn_oV_{2-o}O_4$, $Li_xMn_oFe_{2-o}O_4$, $Li_xNi_aCo_dAl_{1-a-d}O_2$, $Li_xCoPO_4$, $Li_xFePO_4$, $Li_xVPO_4$, $Li_xMnPO_4$, and the like (here, x=0.02 to 1.2, a=0.1 to 0.9, b=0.8 to 0.98, c=1.2 to 1.96, d=0,1 to 0.9, z=2.01 to 2.3, and a+d=0.8 to 0.98). Preferable examples of the lithium-containing metal oxide include at least one selected from the group consisting of $Li_xCoO_2$, $Li_xNiO_2$, $Li_xMnO_2$, $Li_xCo_aNi_{1-a}O_2$, $Li_xMn_2O_4$, $Li_xCo_bV_{1-b}O_z$, and $Li_xFePO_4$ (here, x, a, b, and z are the same as the above). A value of x is a value before charging and discharging are started, and is increased or decreased by charging and discharging.

As the positive electrode active material, one kind. may be used singly, or two or more kinds may be used in combination thereof. An average particle diameter of the positive electrode active material is only required to exhibit an effect of the present invention, and is not particularly limited.

[Negative Electrode Active Material]

As a negative electrode active material contained. in the electrode mixture layer of the present invention, one or more kinds of conventionally known materials known. as a negative electrode active material in a nonaqueous electrolyte secondary battery can be selected to be used. For example, in a case of a lithium ion secondary battery, a carbon material capable of occluding and releasing a lithium ion, Si or Sn, an alloy or an oxide containing at least one of these materials, or the like can be used. Among these materials, the carbon material is preferable.

Typical examples of the carbon material include natural graphite, artificial graphite manufactured by heat-treating petroleum-based coke and coal-based coke, hard carbon obtained by carbonizing a resin, and a mesophase pitch-based carbon material. When natural graphite or artificial graphite is used, a spacing d (002) of plane (002) in a graphite structure by powder X-ray diffraction is preferably in a range of 0.335 to 0.337 nm from a viewpoint of increase in a battery capacity.

Natural graphite means a graphite material produced naturally as ore. Natural graphite is classified into two kinds of scaly graphite having a high degree of crystallization and earthy graphite having a low degree of crystallization by an appearance and a property thereof. Scaly graphite is further classified into scaly graphite having a leaf-like appearance and massive scaly graphite. An origin, a property, and the kind of natural graphite as a graphite material are not particularly limited. Natural graphite or a particle manufactured using natural graphite as a raw material may be subjected to a heat treatment.

Artificial graphite means graphite manufactured by an artificial method in a broad sense and a graphite material close to a perfect crystal of graphite. Typical examples thereof include graphite obtained by subjecting tar and coke obtained from a residue or the lake due to dry distllation of coal or distillation of crude oil as a raw material to a firing process at about 500 to 1000° C. and a graphitization process at 2000° C. or higher. Kish graphite obtained by reprecipitation of carbon from molten iron is a kind of artificial graphite.

It is effective to use an alloy containing at least one of Si and Sn in addition to the carbon material as the electrode active material because an electric capacity can be smaller than a case where each of Si and Sn is used singly or each of oxides thereof is used. Among the alloys, an Si-based alloy is preferable.

Examples of the Si-based alloy include an alloy of Si and at least one element selected from the group consisting of B, Mg, Ca, Ti, Fe, Co, Mo, Cr, V, W, Ni, Mn, Zn, Cu, and the like. Specific examples thereof include at least one selected from the group consisting of $SiB_4$, $SiB_6$, $Mg_2Si$, $Ni_2Si$ $TiSi_2$, $MoSi_2$, $CoSi_2$, $NiSi_2$, $CaSi_2$, $CrSi_2$, $Cu_5Si$, $FeSi_2$, $MnSi_2$, $VSi_2$, $WSi_2$, $ZnSi_2$, and the like.

In the present invention, as the negative electrode active material, one kind of the above described material may be used singly, or two or more kinds may be used in combination thereof. An average particle diameter of the negative electrode active material is only required to exhibit an effect of the present invention, and is not particularly limited.

(3) Binder

Next, the binder contained in the electrode mixture layer of the present invention will be described in detail.

As the binder contained in the electrode mixture layer of the present invention, a binder capable of molding an electrode and having a sufficient electrochemical stability can be used. As such a binder, it is preferable to use at least one selected from the group consisting of polyvinyl alcohol, polyacrylic acid, carboxymethyl cellulose, polytetrafluoroethylene (PTFE), polyvinylidene fluoride (PVDF), styrene-butadiene rubber (SBR), a fluoroolefin copolymer cross-linked polymer, polyde, polyamideimide, aramid, a phenol resin, and the like. It is particularly preferable to use polyvinylidene fluoride (PVDF).

A shape at the time of use as a binder is not particularly limited, but may be a solid or a liquid (for example, an emulsion), and can be appropriately selected considering a method for manufacturing an electrode (particularly, whether the method is dry kneading or wet kneading), solubility in an electrolytic solution, and the like.

A solvent for dissolving the binder is not particularly limited as long as dissolving the binder. Specific examples thereof include at least one selected from the group consisting of N-methylpyrrolidone (NMP), dimethylacetamide (DMAc), dimethylformamide (DMF), dimethyl sulfoxide (DMSO) and the like. Particularly, PEP or DMAc is preferable.

2. Electrode Mixture Layer According to Second Aspect

A second aspect of the invention is an electrode mixture layer including an electrode active material, a carbon-based conductive agent containing fibrous carbon having an average effective length of 10 µm or more, and a binder, and the electrode mixture layer having a thickness of 50 µm or more, characterized in that the average effective length of the fibrous carbon is ⅓ or less of the film thickness of the electrode mixture layer.

The fibrous carbon in which the average effective length is ⅓ or less of the film thickness of the electrode mixture layer is easily dispersed three-dimensionally in a random manner in the electrode mixture layer. Therefore, a conductive path is formed by the fibrous carbon in the electrode mixture layer, and a resistance value in the film thickness direction can be reduced.

The average effective length of the fibrous carbon is ⅓ or less, and preferably 3/10 or less of the film thickness of the electrode mixture layer. When the average effective length is more than ⅓ thereof, the fibrous carbon is not easily dispersed three-dimensionally in a random manner.

The average effective length of the fibrous carbon is preferably 1/100 or more of the film thickness of the electrode mixture layer, more preferably 1/70 or more thereof, and still more preferably 1/50 or more thereof. When the average effective length is less than 1/100 thereof, a conductive path formed by the fibrous carbon becomes short easily. As a result, a resistance value of the electrode mixture layer in the film thickness direction is not necessarily reduced sufficiently.

A preferable form of the electrode mixture layer according to the second aspect of the invention, a constituent material thereof, and a method for manufacturing the electrode mixture layer are similar to those in the first aspect of the invention.

3. Electrode Mixture Layer According to Third Aspect

A third aspect of the invention is an electrode mixture layer including an electrode active material, a carbon-based conductive agent containing fibrous carbon having an average effective length of 10 µm or more, and a binder, and the electrode mixture layer having a film thickness of 50 µm or more, characterized in that the content of the fibrous carbon in the electrode mixture layer is from 0.5 to 3.0% by mass, and the electric conductivity in the film thickness direction is 0.0005 $Scm^{-1}$ or more.

In the third aspect of the invention, a conductive path is formed by the fibrous carbon in the film thickness direction of the electrode mixture layer, and therefore the electric conductivity in the film thickness direction can be 0.0005 $Scm^{-1}$ or more even when the content of the fibrous carbon is from 0.5 to 3.0% by mass. The content of the fibrous carbon is preferably from 0.5 to 2.5% by mass, and more preferably from 1.0 to 2.5% by mass. When the content is less than 0.5% by mass, it is difficult to make the electric conductivity in the film thickness direction 0.0005 Scm$^{-1}$ or more. When the content is more than 3.0% by mass, the electric conductivity in the film thickness direction is high. However, when a cell having an optional capacity is manufactured, the amount of an active material in an electrode is small, and application to a power source highly requiring an energy density may be difficult.

A value of the electric conductivity in the film thickness direction is preferably 0.0007 Scm$^{-1}$ or more, and more preferably 0.0009 Scm$^{-1}$ or more.

A preferable form of the electrode mixture layer according to the third aspect of the invention, a constituent material thereof, and a method for manufacturing the electrode mixture layer are similar to those in the first aspect of the invention.

4. Electrode Mixture Layer According to Fourth Aspect

A fourth aspect of the invention is an electrode mixture layer including an electrode active material, a carbon-based conductive agent containing fibrous carbon having an average effective length of 10 μm or more, and a binder, and the electrode mixture layer having a film thickness of 50 μm or more, characterized in that an average aspect ratio of the fibrous carbon and a volume content of the fibrous carbon satisfy the following formula (1).

$$0.8 \leq \text{average aspect ratio} \times \text{volume content(vol \%)} \leq 3.5 \quad \text{formula (1)}$$

In the fourth aspect of the invention, by satisfying the above formula (1), a conductive path in which fibers of the fibrous carbon are in contact with each other is formed while being penetrating the electrode mixture layer in the film thickness direction thereof. The range in formula. (1) is more preferably 0.9 or more and 3.0 or less, and still more preferably 1.0 or more and 2.5 or less.

FIG. 30 illustrates a simulation analysis result of percolation behaviors of fibrous carbon having different fiber lengths using an analysis software DIGIMAT-FE. Percolation means a state in which a conductive path in which fibers of the fibrous carbon are in contact with each other penetrates an electrode in a film thickness direction thereof.

A ratio of fibrous carbon involved in formation of the conductive path with respect to the generated fibrous carbon is represented by Pa. That is, Pa closer to 100% is more effective for fibrous carbon to form a conductive path, leading to rapid improvement of the electric conductivity of an electrode.

A longer fiber length causes percolation at a lower addition amount (vol %). A longer fiber length makes the Pa value larger at the same addition amount.

In the present invention, a conductive path is formed effectively because a ratio (aspect ratio) of an effective length with respect to a fiber diameter of fibrous carbon satisfies the above formula (1), and therefore an electrode mixture layer having excellent electric conductivity can be provided.

A preferable form of the electrode mixture layer according to the fourth aspect of the invention, a constituent material thereof, and a method for manufacturing the electrode mixture layer are similar to those in the first aspect of the invention.

5. Electrode for Nonaqueous Electrolyte Secondary Batteries

Hereinafter, an electrode for nonaqueous electrolyte secondary batteries of the present invention (hereinafter, also simply referred to as "electrode") will be described.

The electrode of the present invention includes a current collector and an electrode mixture layer stacked on a surface of the current collector, and the electrode mixture layer is formed of the electrode mixture layer for nonaqueous electrolyte secondary batteries of the present invention.

The following two methods are general methods for manufacturing an electrode. In one method, an electrode active material, a carbon-based conductive agent, and a binder are mixed and kneaded, are formed into a film by extrusion molding, are rolled and stretched, and then are bonded to a current collector.

In the other method, an electrode active material, a carbon-based conductive agent, a binder, and a solvent for dissolving the binder are mixed to prepare a slurry, this slurry is applied on a surface of a current collector, the solvent is removed, and then pressing is performed.

In the present invention, either method can be used, but the latter method is more suitable, and therefore the latter method will be described in detail below.

In manufacturing an electrode in the present invention, an addition ratio of a carbon-based conductive agent in a slurry is preferably 20% by mass or less, more preferably 15% by mass or less, and still more preferably 10% by mass or less with respect to the total amount of an electrode mixture layer, that is, the total amount of an electrode active material, the carbon-based conductive agent, and a binder. When the addition ratio of the carbon-based conductive agent is more than 20% by mass, in a case where a cell having an optional capacity is manufactured, the amount of an active material in an electrode is small, and application to a power source highly requiring an energy density may be difficult. The lower limit value of the addition ratio of the carbon-based conductive agent in a slurry is preferably 0.5% by mass or more with respect to the total amount of the electrode mixture layer.

An addition ratio of the electrode active material in the present invention is preferably 60% by mass or more, more preferably 70 to 98.5% by mass, and still more preferably 75 to 98.5% by mass with respect to the total amount of the electrode active material, the carbon-based conductive agent, and the binder. When the amount of the electrode active material is less than 60% by mass, application to a power source highly requiring an energy density may be difficult. When the amount of the electrode active material is more than 98.5% by mass, the amount of the binder is too small to generate a crack in the electrode mixture layer, or the electrode mixture layer may be peeled from the current collector. Alternately, the amount of the carbon-based conductive agent is too small, and conductivity of the electrode mixture layer may be insufficient.

An addition ratio of the binder in the present invention is preferably from 1 to 25% by mass, more preferably from 3 to 15% by mass, and still more preferably from 5 to 10% by mass with respect to the total amount of the electrode active material, the carbon-based conductive agent, and the binder. When the amount of the binder is less than 1% by mass, a crack may be generated in the electrode mixture layer, or the electrode mixture layer may be peeled from the current collector. When the amount of the hinder is more than 25% by mass, in a case where a cell having an optional capacity is manufactured, the amount of an active material in an electrode is small, and application to a power source highly requiring an energy density may be difficult.

When an electrode is manufactured, too strong thixotropy in a slurry may make it difficult to secure fluidity suitable for application. In such a case, a slurry assistant may be used. Examples of the slurry assistant include at least one selected from the group consisting of polyvinyl pyrrolidone, carboxymethyl cellulose, polyvinyl acetate, polyvinyl alcohol, and the like. Particularly, polyvinyl pyrrolidone is preferably used. By adding such a slurry assistant as described above, sufficient fluidity can be secured even with a small amount of a solvent, and dispersibility of a carbon-based conductive agent is improved significantly. In addition, generation of a crack after removal of a solvent can be suppressed. An addition amount of the slurry assistant is preferably 10% by mass or less, more preferably from 0.5 to 10% by mass, and still more preferably from 0.5 to 8% by mass with respect to the total amount of components other than a solvent in a slurry. When the addition amount of the slurry assistant is more than 10% by mass, a slurry viscosity is rapidly decreased on the contrary, and insufficient dispersion may occur to make it difficult to manufacture a preferable slurry. When the addition amount of the slurry assistant is less than 0.5% by mass, an effect of the slurry assistant does not appear easily.

A solid concentration in the slurry (ratio of the total mass of components other than a solvent in the slurry with respect to the total mass of the slurry) is preferably from 10 to 80% by mass, and more preferably from 20 to 70% by mass. When the solid concentration is more than 80% by mass, it may be difficult to manufacture a uniform slurry. When the solid concentration is less than 10% by mass, the viscosity of the slurry is insufficient, and the thickness of an electrode may be non-uniform.

The slurry is applied on a surface of a current collector described below. As an application method, an appropriate application method such as a doctor blade method can be used. After application, for example, a solvent is removed by a heat treatment at 60 to 150° C., preferably at 80 to 120° C. preferably for 60 to 180 minutes. Thereafter, by pressing the applied product after removal of the solvent, an electrode can be manufactured.

The electrode mixture layer on the current collector, obtained in such a manner as described above, contains the electrode active material, the carbon-based conductive agent, and the binder. Contents of these materials are the same as the addition ratios thereof in the slurry in manufacturing an electrode. The content of the electrode active material, the content of the carbon-based conductive agent, and the content of the binder are preferably from 70 to 98.5%, from 0.5 to 20%, and from 1 to 25%, respectively, with respect to the total amount of the electrode active material, the carbon-based conductive agent, and the binder based on a mass (the total amount is assumed to be 100% by mass).

The current collector used for the electrode of the present invention can be formed from any conductive material. For example, the current collector can be formed from a metal material of aluminum, nickel, iron, stainless steel., titanium, or copper. Particularly, the current collector is preferably formed from aluminum, stainless steel, or copper. Aluminum or aluminum subjected to carbon coating is more preferably used for a positive electrode. Copper is more preferably used for a negative electrode.

The thickness of the current collector is preferably from 10 to 50 μm.

In the electrode of the present invention, a joint layer in which the degree of orientation of the fibrous carbon in the in-plane direction is 0.4 or more and less than 0.7 is preferably formed on a side of the current collector of the inner layer portion. This increases an electric connection between the conductive path and the current collector formed in the inner layer portion. The degree of orientation of the fibrous carbon in the in-plane direction in the joint layer is more preferably 0.45 or more and less than 0.7, and still more preferably 0.45 or more and less than 0.65.

When the degree of orientation is less than 0.4, an electric connection between the conductive path and the current collector formed in the inner layer portion of the electrode mixture layer may be insufficient. When the degree of orientation is 0.7 or more, a resistance of the electrode mixture layer in the film thickness direction is increased easily.

The thickness of the joint layer is 20 μm or less, preferably 0.05 μm or more, and preferably from 1 to 20 μm. When the thickness is more than 20 μm, a resistance of the electrode mixture layer is increased easily.

6. Nonaqueous Electrolyte Secondary Batteries

Hereinafter, the nonaqueous electrolyte secondary battery of the present invention will be described. The nonaqueous electrolyte secondary battery of the present invention includes the electrode for nonaqueous electrolyte secondary batteries of the present invention.

Examples of the nonaqueous electrolyte secondary battery of the present invention include a lithium ion secondary battery, a lithium battery, and a lithium ion polymer battery, but the lithium ion secondary battery is preferable. The nonaqueous electrolyte secondary battery of the present invention may include a positive electrode in which a positive electrode material layer is formed on a surface of a current collector, an electrolyte layer containing an electrolyte, and a negative electrode for the nonaqueous electrolyte secondary battery of the present invention, and may be obtained by stacking these such that the positive electrode material layer in the positive electrode faces a negative electrode material layer in the negative electrode of the present invention and the electrolyte layer is inserted between the positive electrode material layer and the negative electrode material layer. In addition, the nonaqueous electrolyte secondary battery of the present invention may include a positive electrode for the nonaqueous electrolyte secondary battery of the present invention, an electrolyte layer containing an electrolyte, and a negative electrode in which a negative electrode material layer is formed on a surface of a current collector, and may be obtained by stacking these such that a positive electrode material layer in the positive electrode of the present invention faces the negative electrode material layer in the negative electrode and the electrolyte layer is inserted between the positive electrode material layer and the negative electrode material layer. Furthermore, the nonaqueous electrolyte secondary battery of the present invention may include a positive electrode for the nonaqueous electrolyte secondary battery of the present invention, an electrolyte layer containing an electrolyte, and a negative electrode for the nonaqueous electrolyte secondary battery of the present invention, and may be obtained by stacking these such that a positive electrode material layer in the positive electrode of the present invention faces a negative electrode material layer in the negative electrode of the present invention and the electrolyte layer is inserted between the positive electrode material layer and the negative electrode material layer.

As the electrolyte layer forming the nonaqueous electrolyte secondary battery of the present invention, any electrolyte layer can be used as long as an object and an effect of the present invention are not impaired. For example, as the electrolyte layer, a liquid electrolyte such as a solution in which a Lithium salt is dissolved in an organic solvent can be used. However, when such a liquid electrolyte is used, it is generally preferable to use a separator formed of a porous layer in order to prevent direct contact between the positive electrode active material layer and the negative electrode active material layer. As the electrolyte layer, a solid electrolyte can be also used. In this case, a separate separator can be omitted.

Examples of an organic solvent forming the liquid electrolyte include ethylene carbonate (EC), diethyl carbonate (DEC), propylene carbonate (PC), dimethyl carbonate (DMC), and ethyl methyl carbonate (EMC). These organic solvents can be used singly or in combination of two or more kinds thereof. Examples of the lithium salt forming the liquid electrolyte include $LiPF_6$, $LiClO_4$, $LiN(CF_3SO_2)_2$, and $LiBF_4$. These lithium salts can be used singly or in combination of two or more kinds thereof.

A known additive may be added to the electrolyte in order to improve cycle stability, a charge-discharge efficiency, or the like.

EXAMPLES

Hereinafter, the present invention will be described more specifically with Examples, but is not limited. thereby in any way.

Various measurements and analyses in Examples were performed by the following methods.

(1) Precursor molded body, average fiber diameter of fibrous carbon, calculation of average effective length, and shape confirmation of other carbon-based conductive agents Observation and photographing were performed using a scanning electron microscope (S-2400 manufactured by Hitachi, Ltd.). As for an average fiber diameter of fibrous carbon in a powder, fiber diameters were measured at 20 points selected from the obtained electron micrograph at random, and an average value of all the measurement results (n=20) was defined as the average fiber diameter. An average effective length of fibrous carbon in a powder was calculated similarly.

(2) X-Ray Diffraction Measurement of Fibrous Carbon

X-ray diffraction measurement was in conformity to a JIS R7651 method using RINT-2100 manufactured by Rigaku Corporation, and a lattice spacing (d002) and a crystallite size (Lc002) were measured.

(3) Effective Length of Fibrous Carbon

An electrode containing fibrous carbon was observed using a scanning electron microscope (TM-3000 manufactured by Hitachi, Ltd.), and it was confirmed that the fibrous carbon was not rounded in the electrode mixture layer forming the electrode. Thereafter, the electrode mixture layer in the electrode was dissolved in a solvent, and observation and photographing were performed using a digital microscope (VHX-200 manufactured by KEYENCE CORPORATION). As for an average effective length of fibrous carbon, fiber diameters were measured at 20 points selected from the photograph at random, and an average value of all the measurement results (n=20) was defined as the average effective length.

Manufacturing Example 1

Manufacturing Fibrous Carbon 90 parts by mass of high-density polyethylene as a thermoplastic resin. (HI-ZEX (registered trademark) 5000SR manufactured by Prime Polymer Co., Ltd.; melt viscosity: 14 Pa s at 350° C. and 600 $s^{-1}$) and 10 parts by mass of synthetic mesophase pitch AR·MPH as a thermoplastic carbon precursor (manufactured by Mitsubishi Gas Chemical Co., Ltd.) were melted and kneaded using a same direction twin-screw extruder ("TEM-26SS" manufactured by Toshiba Machine Co., Ltd., barrel temperature: 310° C. in a stream of nitrogen) to prepare a resin composition.

The above resin composition was spun from a spinneret at 390° C. with a cylinder-type single-hole spinning machine to manufacture a precursor molded body (sea-island type composite fiber containing a thermoplastic carbon precursor as an island component).

Subsequently, the precursor molded body was allowed to stand in the air at 215° C. for three hours with a hot air drier to obtain a stabilized precursor molded body.

Subsequently, the stabilized precursor molded body was subjected to nitrogen substitution in a vacuum gas substitution furnace, and then the pressure thereof was reduced to 1 kPa. The temperature was raised to 500° C. at a temperature-rising rate of 5° C./minute under reduced pressure, and the stabilized precursor molded body was allowed to stand at 500° C. for one hour. The thermoplastic resin was thereby removed to form a fibrous carbon precursor. Subsequently, the fibrous carbon precursor was added to ion-exchange water, and was pulverized with a mixer for two minutes to manufacture a preliminary dispersion liquid in which the fibrous carbon precursor was dispersed at 0.1% by mass.

This preliminary dispersion liquid was repeatedly subjected to a treatment ten times at a nozzle diameter of 0.17 mm and a treatment pressure of 100 MPa using a wet jet mill (Star Burst Labo HJP-17007 manufactured by Sugino Machine Limited, used chamber: single nozzle chamber). A dispersion liquid of the fibrous carbon precursor was thereby manufactured. Subsequently, a solvent liquid was filtered from the resulting dispersion liquid to manufacture a nonwoven fabric formed of the fibrous carbon precursor.

The temperature of this nonwoven fabric was raised from room temperature to 3000° C. in an argon gas atmosphere over three hours to manufacture fibrous carbon. The resulting fibrous carbon in a powder had an average fiber diameter of 346 nm and an average effective length of 21 μm, and a branched, structure was not observed, therein. That is, a linear structure was confirmed. An average spacing d002 of plane (002) measured by an X-ray diffraction method was 0.3375 nm. Here, FIG. 1 illustrates a scanning electron micrograph (2,000 times) of an ultrafine carbon fiber (hereinafter, also referred to as CNF) which is the manufactured fibrous carbon. FIGS. 2 and 3 illustrate histograms obtained by measuring a fiber diameter and an effective length in a powder.

<Effective Length of Fibrous Carbon in Electrode Mixture Layer>

FIG. 4 illustrates a typical photograph among photographs taken with a digital microscope. (VHX-200 manufactured by Keyence Corporation) after an electrode mixture layer of an electrode including the fibrous carbon in Manufacturing Example 1 is dissolved in a solvent and is dried. The fibrous carbon had an average effective length of 19.6 μm. FIG. 31 illustrates a histogram obtained by measuring an effective length thereof.

<The Degree of Orientation of Fibrous Carbon in In-Plane Direction in Surface Layer Portion>

A surface (surface layer portion) of the electrode mixture layer on a side on which the electrode mixture layer was not in contact with the current collector of the electrode including the fibrous carbon in Manufacturing Example 1 was observed using a scanning electron microscope (TM-3000 manufactured by Hitachi, Ltd.). As a result, it was confirmed that the degree of orientation of the fibrous carbon in the surface layer portion did not depend on the film thickness of the electrode mixture layer. FIG. 5 illustrates a typical photograph (2,000 times) (corresponding to Example 4). The photograph represented by FIG. 5 indicates that the effective length observed in the surface layer portion was 16.2 μm and the degree of orientation of the fibrous carbon in the in-plane direction in the surface layer portion was 0.83. When it is assumed that an observable depth is 2 μm (when an average particle diameter of an active material is assumed to be 2 μm), an angle (orientation angle) between an electrode surface and the fibrous carbon is calculated to be 7.0°.

FIGS. 6 (surface layer portion) and 7 (central portion of electrode) illustrate results of observing a cross section of the electrode and mapping with an energy dispersive X-ray analyzer (Quantax70 manufactured by Bruker AXS). As clear from FIGS. 6 and 7, a large part of the fibrous carbon is oriented in the in-plane direction of the electrode in the surface layer portion. Meanwhile, the fibrous carbon is present three-dimensionally in an oriented state close to a random state in the central portion of the electrode. FIG. 8 is a diagram schematically illustrating an oriented state of fibrous carbon in a thick-film electrode. FIG. 9 is a diagram schematically illustrating an oriented state of fibrous carbon in a thin-film electrode. The central portion of the electrode means a portion obtained by removing a surface (surface layer portion) of the electrode mixture layer on a side on which the electrode mixture layer is not in contact with the current collector and the current collector from the whole electrode.

Example 1

<Manufacturing Electrode>

2 parts by mass of the fibrous carbon (CNF) in Manufacturing Example 1 as a carbon-based conductive agent, 91 parts by mass of a positive electrode active material (LiFePO$_4$; SLFP-ES01 manufactured by Hohsen Corporation), 7 parts by mass of polyvinylidene fluoride (W#7200 manufactured by Kureha Corporation) as a binder, and N-methylpyrrolidone as a solvent were used to manufacture a slurry. The manufactured slurry was applied on a current collector (aluminum foil having a thickness of 15 μm), was then dried at 120° C. for three hours, and was pressed to manufacture an electrode. An electrode mixture layer forming the electrode had a film thickness of 72 μm, a porosity of 25%, and a density of 2.5 g/cm$^3$.

The degree of orientation of the fibrous carbon in the in-plane direction was observed while a portion from a surface of the electrode mixture layer to a depth 30 μm was removed. The effective length observed in the inner layer portion was 4.8 μm and the degree of orientation of the fibrous carbon in the in-plane direction in the inner layer portion was 0.24. When it is assumed that an observable depth is 2 μm, an angle (orientation angle) between an electrode surface and CNF is calculated to be 22.5'.

Example 2

<Manufacturing Electrode>

An electrode was manufactured by performing operations in a similar manner to Example 1 except that the film thickness of an electrode mixture layer was 92 μm and the density thereof was 2.6 g/cm$^3$.

Example 3

<Manufacturing Electrode>

An electrode was manufactured by performing operations in a similar manner to Example 1 except that the film thickness of an electrode mixture layer was 106 μm and the density thereof was 2.5 g/cm$^3$.

Example 4

<Manufacturing Electrode>

An electrode was manufactured by performing operations in a similar manner to Example 1 except that the film thickness of an electrode mixture layer was 119 μm and the density thereof was 2.6 g/cm$^3$.

As described above, the effective length observed in the surface layer portion was 16.2 μm. and the degree of orientation of the fibrous carbon in the in-plane direction in the surface layer portion was 0.83. When it is assumed that an observable depth is 2 μm (when an average particle diameter of an active material is assumed to be 2 μm), an angle (orientation angle) between the surface layer portion and CNF is calculated to be 7.0°.

Similar observation was performed while a portion from a surface of the electrode mixture layer to a depth 60 μm was removed. The observed average effective length was 4.4 μm and the degree of orientation of the fibrous carbon in the in-plane direction in the inner layer portion was 0.22. When it is assumed that an observable depth is 2 μm, an angle (orientation angle) between an electrode surface and CNF is calculated to be 24.5'.

A surface of the electrode mixture layer on a side on which the electrode mixture layer was in contact with a current collector (that is, joint layer) was observed similarly. The average effective length observed in the joint layer portion was 10.4 μm and the degree of orientation of the fibrous carbon in the in-plane direction in the joint layer portion was 0.53. When it is assumed that an observable depth is 2 μm, an angle (orientation angle) between an electrode surface and CNF is calculated to be 10.9°.

Example 5

<Manufacturing Electrode>

An electrode was manufactured by performing operations in a similar manner to Example 1 except that the film thickness of an electrode mixture layer was 146 μm and the density thereof was 2.6 g/cm$^3$.

Example 6

<Manufacturing Electrode>

An electrode was manufactured by performing operations in a similar manner to Example 1 except that the film thickness of an electrode mixture layer was 165 μm and the density thereof was 2.6 g/cm$^3$.

Example 7

<Manufacturing Electrode>

An electrode was manufactured by performing operations in a similar manner to Example 1 except that 1 part by mass of the fibrous carbon. (CNF) used in Example 1 as a carbon-based conductive agent and 1 part by mass of acetylene black (AB) (Denka Black manufactured by Denka Company Limited) were used. An electrode mixture layer had a film thickness of 71 µm and a density of 2.5 g/cm³.

Example 8

<Manufacturing Electrode>

An electrode was manufactured by performing operations in a similar manner to Example 7 except that the film thickness of an electrode mixture layer was 121 µm and the density thereof was 2.6 g/cm³.

Example 9

<Manufacturing Electrode>

An electrode was manufactured by performing operations in a similar manner to Example 7 except that the film thickness of an electrode mixture layer was 152 µm and the density thereof was 2.6 g/cm³.

Example 10

<Manufacturing Electrode>

5 parts by mass of the fibrous carbon (CNF), 88 parts by mass of a positive electrode active material (LiFePO$_4$; SLFP-ES01 manufactured by Hohsen Corporation), 7 parts by Mass of polyvinylidene fluoride (W#7200 manufactured by Kureha Corporation.) as a binder, and N-methylpyrrolidone as a solvent were used to manufacture a slurry. The manufactured slurry was applied, on an aluminum foil, and was dried to manufacture an electrode. An electrode mixture layer forming the electrode had a film thickness of 121 µm and a density of 2.5 g/cm³.

However, the electric conductivity was excellent but an addition amount of the fibrous carbon (CNF) was excessive. Therefore, the amount of a positive electrode active material in the electrode mixture layer was small, and as a result, the capacity of the battery was small.

Comparative Example 1

<Manufacturing Electrode>

An electrode was manufactured by performing operations in a similar manner to Example 1 except that the film thickness of an electrode mixture layer was 18 µm and the density thereof was 2.5 g/cm³.

Comparative Example 2

<Manufacturing Electrode>

An electrode was manufactured by performing operations in a similar manner to Example 1 except that the film thickness of an electrode mixture layer was 30 µm and the density thereof was 2.5 g/cm³.

Comparative Example 3

<Manufacturing Electrode>

An electrode was manufactured by performing operations in a similar manner to Example 7 except that the film thickness of an electrode mixture layer was 20 µm and the density thereof was 2.5 g/cm³.

Comparative Example 4

<Manufacturing Electrode>

An electrode was manufactured by performing operations in a similar manner to Example 1 except that the fibrous carbon used in Example 1 (Star Burst manufactured by Sugino Machine Limited) was pulverized to be used as fibrous carbon (S-CNF) having an average effective length of 5.5 µm. FIGS. 10 (2,000 times) and 11 (8,000 times) illustrate photographs of the fibrous carbon (S-CNF) having an average effective length of 5.5 µm taken with a scanning electron microscope (S-2400 manufactured by Hitachi, Ltd.). An electrode mixture layer had a film thickness of 20 µm and a density of 2.6 g/cm³. FIG. 12 illustrates a histogram obtained by measuring the effective length in a powder.

FIG. 13 illustrates a typical photograph among photographs taken with a digital microscope (VHX-200 manufactured by Keyence Corporation) after an electrode mixture layer of an electrode including the fibrous carbon (S-CNF) is dissolved in a solvent and is dried. The fibrous carbon (S-CNF) had an effective length of 5.5 µm.

<Degree of Orientation of Fibrous Carbon (S-CNF) in In-Plane Direction in Electrode Surface Layer Portion>

A surface (electrode surface layer) of an electrode including the fibrous carbon (S-CNF) on a side on which the electrode was not in contact with a current collector was observed using a scanning electron microscope (TM-3000 manufactured by Hitachi, Ltd.). As a result, it was confirmed that the degree of orientation of the fibrous carbon (S-CNF) in the surface layer portion did not depend on the film thickness of the electrode mixture layer. FIG. 14 illustrates a typical photograph (5,000 times). The photograph represented by FIG. 14 indicates that the effective length of the fibrous carbon (S-CNF) observed in the surface layer portion was 5.0 µm and the degree of orientation of the fibrous carbon (S-CNF) in the in-plane direction in the surface layer portion was 0.91.

Comparative Example 5

<Manufacturing Electrode>

An electrode was manufactured by performing operations in a similar manner to Comparative Example 4 except that the film thickness of an electrode mixture layer was 30 µm and the density thereof was 2.5 g/cm³.

Comparative Example 6

<Manufacturing Electrode>

An electrode was manufactured by performing operations in a similar manner to Comparative Example 4 except that the film thickness of an electrode mixture layer was 74 µm and the density thereof was 2.5 g/cm³.

Comparative Example 7

<Manufacturing Electrode>

An electrode was manufactured by performing operations in a similar manner to Comparative Example 4 except that the film thickness of an electrode mixture layer was 85 µm and the density thereof was 2.6 g/cm³.

Comparative Example 8

<Manufacturing Electrode>

An electrode was manufactured by performing operations in a similar manner to Comparative Example 4 except that the film thickness of an electrode mixture layer was 104 µm and the density thereof was 2.5 g/cm³.

Comparative Example 9

<Manufacturing Electrode>

An electrode was manufactured by performing operations in a similar manner to Comparative Example 4 except that the film thickness of an electrode mixture layer was 123 μm and the density thereof was 2.5 g/cm³.

<Measuring Resistance of Electrode>

Table 1 and FIGS. 15 and 16 illustrate results of measuring an electrode resistance of the manufactured electrode in the film thickness direction using a potentiostat/galvanostat (HA-151 manufactured by Hokuto Denko Co., Ltd.), and an electric conductivity calculated from the resistance value. These indicate that fibrous carbon having a longer effective length makes the resistance (electrode resistance) lower, and makes the electric conductivity (electrode conductivity) higher is considered that the conductivity depends on a film thickness due to the degree of orientation of fibrous carbon.

1-A", for example. Example or Comparative Example using a polyethylene porous separator was expressed as "Example 1-B", for example.

<Discharge Rate Characteristics>

Pre-cycle was performed using a coin cell manufactured in such a manner as described above with a charge-discharge device (HJ-1005SD8 manufactured by Hokuto Denko Corporation.), and then discharge rate characteristics were measured. As pre-cycle conditions, charging was performed at a 0.2 C constant current to 4.0 V, charging was then performed at a constant voltage (0.01 C cut-off), and a rest period of 10 minutes was provided. Thereafter, discharging was performed at a 0.2 C constant current to 2.5 V, and a rest period of 10 minutes was provided. One cycle constituted by these operations was repeated five times. After the ore-cycle was performed, discharge rate characteristics were evaluated. Measurement conditions of discharge rate characteristics were as follows. As charging conditions, charging was

TABLE 1

| | conductive agent | average effective length of single substance μm | average effective length in inner layer portion μm | average effective length in surface layer portion μm | the degree of orientation in surface layer portion | film thickness of electrode mixture layer μm | effective length/film thickness of electrode mixture layer | electrode density g/cm³ | electrode Ωcm² | volume resistance Ωcm | conductivity S/cm |
|---|---|---|---|---|---|---|---|---|---|---|---|
| Example 1 | CNF | 21 | 19.6 | 16.2 | 0.83 | 72 | 0.27 | 2.6 | 12 | 1.7 × 10³ | 6.1 × 10⁻⁴ |
| Example 2 | CNF | 21 | 19.6 | 16.2 | 0.83 | 92 | 0.21 | 2.6 | 8.4 | 9.2 × 10² | 1.1 × 10⁻³ |
| Example 3 | CNF | 21 | 19.6 | 16.2 | 0.83 | 106 | 0.18 | 2.5 | 13 | 1.2 × 10³ | 9.2 × 10⁻⁴ |
| Example 4 | CNF | 21 | 19.6 | 16.2 | 0.83 | 119 | 0.16 | 2.6 | 15 | 1.2 × 10³ | 9.3 × 10⁻⁴ |
| Example 5 | CNF | 21 | 19.6 | 16.2 | 0.83 | 146 | 0.13 | 2.6 | 11 | 7.6 × 10² | 1.3 × 10⁻³ |
| Example 6 | CNF | 21 | 19.6 | 16.2 | 0.83 | 165 | 0.12 | 2.6 | 12 | 7.5 × 10² | 1.3 × 10⁻³ |
| Example 7 | CNF + AB | 21 | 19.6 | 16.2 | 0.83 | 71 | 0.28 | 2.5 | 12 | 1.7 × 10³ | 6.2 × 10⁻⁴ |
| Example 8 | CNF + AB | 21 | 19.6 | 16.2 | 0.83 | 121 | 0.16 | 2.6 | 16 | 1.4 × 10³ | 8.0 × 10⁻⁴ |
| Example 9 | CNF + AB | 21 | 19.6 | 16.2 | 0.83 | 152 | 0.13 | 2.6 | 15 | 9.8 × 10² | 1.0 × 10⁻³ |
| Example 10 | CNF | 21 | 19.6 | 16.2 | 0.83 | 121 | 0.16 | 2.5 | 7.6 | 5.2 × 10 | 2.0 × 10⁻² |
| Comparative Example 1 | CNF | 21 | 19.6 | 16.2 | 0.83 | 18 | 1.09 | 2.5 | 8.0 | 4.4 × 10³ | 2.3 × 10⁻⁴ |
| Comparative Example 2 | CNF | 21 | 19.6 | 16.2 | 0.83 | 30 | 0.65 | 2.5 | 11 | 3.7 × 10³ | 2.7 × 10⁻⁴ |
| Comparative Example 3 | CNF + AB | 21 | 19.6 | 16.2 | 0.83 | 20 | 0.98 | 2.5 | 13 | 6.3 × 10³ | 1.7 × 10⁻⁴ |
| Comparative Example 4 | S – CNF | 5.5 | 5.5 | 5.0 | 0.91 | 20 | 0.28 | 2.6 | 18 | 9.2 × 10³ | 1.1 × 10⁻⁴ |
| Comparative Example 5 | S – CNF | 5.5 | 5.5 | 5.0 | 0.91 | 30 | 0.18 | 2.5 | 25 | 8.2 × 10³ | 1.2 × 10⁻⁴ |
| Comparative Example 6 | S – CNF | 5.5 | 5.5 | 5.0 | 0.91 | 74 | 0.07 | 2.5 | 30 | 4.0 × 10³ | 2.6 × 10⁻⁴ |
| Comparative Example 7 | S – CNF | 5.5 | 5.5 | 5.0 | 0.91 | 85 | 0.06 | 2.6 | 35 | 4.1 × 10³ | 2.5 × 10⁻⁴ |
| Comparative Example 8 | S – CNF | 5.5 | 5.5 | 5.0 | 0.91 | 104 | 0.05 | 2.5 | 35 | 3.4 × 10³ | 3.0 × 10⁻⁴ |
| Comparative Example 9 | S – CNF | 5.5 | 5.5 | 5.0 | 0.91 | 123 | 0.04 | 2.5 | 45 | 3.7 × 10³ | 2.8 × 10⁻⁴ |

<Manufacturing Coin Cell>

The positive electrode manufactured in each of Examples and Comparative Examples above was caused to face metal lithium through a glass fiber nonwoven fabric separator or a polyethylene porous separator, and an electrolytic solution formed of a mixed solution of ethylene carbonate and ethylmethyl carbonate (mass ratio: 3/7, manufactured by KISHIDA CHEMICAL Co., Ltd.) containing $LiPF_6$ having a concentration of 1 mol/L was injected into a 2032 type coin cell to manufacture a coin cell for evaluating a cell. In Table 2, Example or Comparative Example using a glass fiber nonwoven fabric separator was expressed as "Example performed at a 0.2 C constant current to 4.0 V, charging was then performed at a constant voltage (0.01 C cut-off), and a rest period of 10 minutes was provided. Thereafter, the operation was switched to discharging. As discharging conditions, discharging was performed at a constant current at a discharge rate by setting a lower limit voltage to 2.5 V. The discharge sate was gradually increased in such a manner as 0.2 C→0.5 C→C→2 C→3 C→5 C→7 C.

FIGS. 17 to 26 illustrate measured discharge rate characteristics. The following Table 2 illustrates a 0.2 C discharge capacity at the time of electrode potential 3V cut-off and a capacity retention ratio at a discharge rate (0.2 C discharge capacity is assumed to be 100%).

TABLE 2

| | effective conductive agent | effective length μm | film thickness of electrode mixture layer μm | electrode density g/cm³ | separator | 0.2 C discharge capacity mAh/g | capacity retention ratio | | | | | | |
|---|---|---|---|---|---|---|---|---|---|---|---|---|---|
| | | | | | | | 0.5 C | 1 C | 2 C | 3 C % | 5 C | 7 C | 10 C |
| Example 1-A | CNF | 21 | 72 | 2.6 | glass nonwoven fabric | 109 | 84 | 65 | 19 | 5 | 0 | 0 | 0 |
| Example 1-B | CNF | 21 | 72 | 2.6 | polyolefin | 119 | 85 | 70 | 32 | 6 | 0 | 0 | 0 |
| Example 4-A | CNF | 21 | 119 | 2.6 | glass nonwoven fabric | 115 | 77 | 27 | 3 | 0 | 0 | 0 | 0 |
| Example 4-B | CNF | 21 | 119 | 2.6 | polyolefin | 120 | 78 | 30 | 5 | 1 | 0 | 0 | 0 |
| Example 7-A | CNF + AB | 21 | 71 | 2.5 | glass nonwoven fabric | 116 | 90 | 71 | 20 | 5 | 0 | 0 | 0 |
| Example 7-B | CNF + AB | 21 | 71 | 2.5 | polyolefin | 118 | 83 | 67 | 38 | 6 | 0 | 0 | 0 |
| Example 8-A | CNF + AB | 21 | 121 | 2.6 | glass nonwoven fabric | 112 | 65 | 77 | 23 | 0 | 0 | 0 | 0 |
| Example 8-B | CNF + AB | 21 | 121 | 2.6 | polyolefin | 119 | 83 | 33 | 2 | 0 | 0 | 0 | 0 |
| Example 10-A | CNF | 21 | 121 | 2.5 | glass nonwoven fabric | 125 | 73 | 44 | 15 | 7 | 1 | 0 | 0 |
| Comparative Example 1-A | CNF | 21 | 18 | 2.5 | glass nonwoven fabric | 114 | 88 | 75 | 61 | 53 | 52 | 45 | 33 |
| Comparative Example 1-B | CNF | 21 | 18 | 2.5 | polyolefin | 118 | 86 | 73 | 59 | 49 | 33 | 15 | 1 |
| Comparative Example 3-A | CNF + AB | 21 | 20 | 2.5 | glass nonwoven fabric | 114 | 89 | 76 | 63 | 54 | 41 | 27 | 4 |
| Comparative Example 3-B | CNF + AB | 21 | 20 | 2.5 | polyolefin | 118 | 86 | 72 | 58 | 48 | 31 | 12 | 1 |
| Comparative Example 4-A | S – CNF | 5.5 | 20 | 2.6 | glass nonwoven fabric | 120 | 88 | 80 | 67 | 56 | 38 | 16 | 0 |
| Comparative Example 4-B | S – CNF | 5.5 | 20 | 2.6 | polyolefin | 120 | 87 | 75 | 60 | 51 | 37 | 17 | 0 |
| Comparative Example 6-A | S – CNF | 5.5 | 74 | 2.5 | glass nonwoven fabric | 109 | 83 | 73 | 11 | 0 | 0 | 0 | 0 |
| Comparative Example 6-B | S – CNF | 5.5 | 74 | 2.5 | polyolefin | 117 | 84 | 68 | 11 | 1 | 0 | 0 | 0 |
| Comparative Example 9-A | S – CNF | 5.5 | 123 | 2.5 | glass nonwoven fabric | 110 | 67 | 14 | 0 | 0 | 0 | 0 | 0 |
| Comparative Example 9-B | S – CNF | 5.5 | 123 | 2.5 | polyolefin | 118 | 52 | 4 | 0 | 0 | 0 | 0 | 0 |

<DC Resistance>

Table 3 illustrates results obtained by calculating a DC resistance from the results of discharge rate characteristics measured as described above. A DC resistance can be calculated by dividing a voltage drop at the time of discharging at 1 mAh/g, 10 mAh/g, 35 mAh/g, or 70 mAh/g by using 0.2 C discharging in the present measurement as a target by a discharge current density value corresponding to 0.2 C.

TABLE 3

| | conductive agent | effective length μm | film thickness of electrode mixture layer μm | separator | 1 mAh/g Ωcm² | 10 mAh/g Ωcm² | 35 mAh/g Ωcm² | 70 mAh/g Ωcm² |
|---|---|---|---|---|---|---|---|---|
| Example 1-A | CNF | 21 | 72 | glass nonwoven fabric | 112 | 124 | 130 | 161 |
| Example 4-A | CNF | 21 | 119 | glass nonwoven fabric | 65 | 97 | 112 | 137 |
| Example 7-A | CNF + AB | 21 | 71 | glass nonwoven fabric | 116 | 129 | 133 | 160 |
| Example 8-A | CNF + AB | 21 | 121 | glass nonwoven fabric | 91 | 107 | 121 | 138 |
| Example 10-A | CNF | 21 | 121 | glass nonwoven fabric | 39 | 72 | 78 | 106 |
| Comparative Example 1-A | CNF | 21 | 18 | glass nonwoven fabric | 270 | 302 | 314 | 447 |
| Comparative Example 3-A | CNF + AB | 21 | 20 | glass nonwoven fabric | 284 | 315 | 320 | 384 |
| Comparative Example 4-A | S – CNF | 5.5 | 20 | glass nonwoven fabric | 285 | 301 | 308 | 393 |
| Comparative Example 6-A | S – CNF | 5.5 | 74 | glass nonwoven fabric | 139 | 149 | 156 | 186 |
| Comparative Example 9-A | S – CNF | 5.5 | 123 | glass nonwoven fabric | 112 | 127 | 137 | 161 |

<Measurement of AC Impedance>

An AC impedance was measured for a coin cell using a potentiostat/galvanostat (SI1287 manufactured by Solartron) and an impedance analyzer (SI1260 manufactured by Solartron). Table 4 and FIG. 27 illustrate results thereof. In the measurement, pre-cycle was performed with a charge-discharge device similarly to measurement for the discharge rate characteristics, and a coin cell in a charged state at 70 mAh/g was used. Comparison between electrodes having almost the same electrode film thickness indicates that fibrous carbon having a longer fiber length makes an impedance lower.

TABLE 4

|  | conductive agent | effective length μm | film thickness of electrode mixture layer μm | separator | 1 Hz Ω | 1 kHz Ω | 100 kHz Ω |
|---|---|---|---|---|---|---|---|
| Example 1-A | CNF | 21 | 72 | glass nonwoven fabric | 23 | 10 | 4.3 |
| Example 4-A | CNF | 21 | 119 | glass nonwoven fabric | 19 | 12 | 4.9 |
| Comparative Example 1-A | CNF | 21 | 18 | glass nonwoven fabric | 20 | 10 | 3.7 |
| Comparative Example 6-A | S – CNF | 5.5 | 74 | glass nonwoven fabric | 38 | 21 | 5.6 |
| Comparative Example 9-A | S – CNF | 5.5 | 123 | glass nonwoven fabric | 36 | 20 | 6.2 |

<Simulation Analysis of Formation of Conductive Path>

Simulation analysis was performed for a method by which fibrous carbon having different fiber lengths forms a conductive path in an electrode film thickness direction using an analysis software DIGIMAT-FE. Table 5 and FIG. 28 illustrate results thereof. As an analysis method, a spherical particle (active material) and a filler (fibrous carbon) were generated in a virtual electrode having each of the electrode mixture layer film thicknesses illustrated in Table 5, and the number of conductive paths formed by the filler and a ratio of an effective active material in contact with the conductive paths were measured. FIG. 29 exemplifies spherical particles and fillers generated. In generation of the filler, surface orientation and random orientation conditions were used. In the plane orientation, orientation conditions of [X-Y-Z]= [0.4–0.4–0.2] (Z: film thickness direction) were used.

As a result or the above analysis, as illustrated in Table 5 and FIG. 28, a longer fiber length makes an effective active material ratio larger and makes the number of conductive paths larger, and therefore it is found that a longer fiber length is more effective for improving conductivity of an electrode. Examination of orientation of fibrous carbon indicates that there is little difference in the effective active material ratio but random orientation is more effective than plane orientation for the number of conductive paths.

TABLE 5

| the amount of active material vol % | the amount of conductive agent vol % | film thickness of electrode mixture layer μm | average effective length μm | orientation | effective active material ratio % | the number of conductive paths |
|---|---|---|---|---|---|---|
| 40 | 2.6 | 10 | 5 | plane orientation | 0.49 | 5 |
| 40 | 2.6 | 30 | 5 | plane orientation | 0 | 0 |
| 40 | 3.0 | 30 | 5 | plane orientation | 3.09 | 51 |
| 40 | 2.6 | 10 | 10 | plane orientation | 8.73 | 116 |
| 40 | 2.6 | 30 | 10 | plane orientation | 9.2 | 138 |
| 40 | 2.6 | 50 | 10 | plane orientation | 23.86 | 93 |
| 40 | 2.6 | 10 | 17.5 | plane orientation | 8.9 | 223 |
| 40 | 2.6 | 30 | 17.5 | plane orientation | 9.53 | 113 |
| 40 | 2.6 | 30 | 17.5 | random | 9.63 | 277 |
| 40 | 2.6 | 50 | 17.5 | plane orientation | 9.81 | 172 |
| 40 | 2.6 | 50 | 17.5 | random | 9.79 | 281 |
| 40 | 2.6 | 30 | 20 | plane orientation | 9.27 | 100 |
| 40 | 2.6 | 50 | 20 | plane orientation | 9.21 | 137 |
| 40 | 2.6 | 50 | 20 | random | 9.58 | 287 |

The invention claimed is:

1. An electrode mixture layer for nonaqueous electrolyte secondary batteries, comprising:
   an electrode active material; and
   a carbon-based conductive agent which is fibrous carbon having an average effective length of 10 to 100 μm and an average fiber diameter of more than 200 nm to less than 1000 nm,
   the electrode mixture layer having a film thickness of more than 100 μm,
   wherein the average effective length of the fibrous carbon is ⅓ or less of the film thickness,
   the content of fibrous carbon having an effective length longer than the average effective length is 40% or less with respect to the whole fibrous carbon based on the number of fibers of the electrode mixture layer for nonaqueous electrolyte secondary batteries, and the degree of orientation of the fibrous carbon in an inner layer portion of the electrode mixture layer in an in-plane direction of the electrode mixture layer is 0.1 or more and less than 0.7.

2. The electrode mixture layer for nonaqueous electrolyte secondary batteries according to claim 1, wherein the average fiber diameter of the fibrous carbon of the electrode mixture layer for nonaqueous electrolyte secondary batteries is 50 nm or more and 900 nm or less is more than 200 nm to less than 600 nm.

3. The electrode mixture layer for nonaqueous electrolyte secondary batteries according to claim 1, wherein an average aspect ratio of the fibrous carbon and a volume content of the fibrous carbon of the electrode mixture layer for nonaqueous electrolyte secondary batteries satisfy the following formula (1):

$$0.8 \leq \text{average aspect ratio} \times \text{volume content (vol \%)}/100 \leq 3.5 \qquad \text{formula (1).}$$

4. The electrode mixture layer for nonaqueous electrolyte secondary batteries according to claim 1, wherein the content of fibrous carbon having an average effective length of 10 to 100 μm of the electrode mixture layer for nonaqueous electrolyte secondary batteries is 10% by mass or more with respect to the total mass of the carbon-based conductive agent.

5. The electrode mixture layer for nonaqueous electrolyte secondary batteries according to claim 1, wherein a conductive path in which fibers of the fibrous carbon are in contact with each other is formed while penetrating the electrode mixture layer in a film thickness direction thereof.

6. The electrode mixture layer for nonaqueous electrolyte secondary batteries according to claim 1, wherein the film thickness of the electrode mixture layer is from 120 to 1000 μm.

7. The electrode mixture layer for nonaqueous electrolyte secondary batteries according to claim 1, wherein the effective length of the fibrous carbon has polydisperse distribution.

8. The electrode mixture layer for nonaqueous electrolyte secondary batteries according to claim 1, wherein the content of the fibrous carbon in the electrode mixture layer is from 0.5 to 3.0% by mass.

9. An electrode for nonaqueous electrolyte secondary batteries, comprising:
a current collector; and
the electrode mixture layer for nonaqueous electrolyte secondary batteries according to claim 1, stacked on the current collector.

10. The electrode for nonaqueous electrolyte secondary batteries according to claim 9, wherein a joint layer in which the degree of orientation of the fibrous carbon in the in-plane direction is 0.4 or more and less than 0.7 is formed on a side of the current collector of the inner layer portion.

11. A nonaqueous electrolyte secondary battery comprising the electrode for nonaqueous electrolyte secondary batteries according to claim 9.

* * * * *